(12) United States Patent
Schlanger

(10) Patent No.: US 6,899,401 B2
(45) Date of Patent: May 31, 2005

(54) VEHICLE WHEEL INCLUDING SPOKE ATTACHMENT

(76) Inventor: Raphael Schlanger, 128 Hulda Hill Rd., Wilton, CT (US) 06897

( * ) Notice: Subject to any disclaimer, the term of this patent is extended or adjusted under 35 U.S.C. 154(b) by 197 days.

(21) Appl. No.: 09/893,166

(22) Filed: Jun. 27, 2001

(65) Prior Publication Data

US 2001/0054840 A1 Dec. 27, 2001

Related U.S. Application Data

(63) Continuation-in-part of application No. 09/210,973, filed on Dec. 14, 1998, now Pat. No. 6,520,595.

(51) Int. Cl.$^7$ .......................... B60B 1/02; B60B 27/00; B60B 21/06
(52) U.S. Cl. ........................ 301/59; 301/55; 301/110.5
(58) Field of Search .............................. 301/55, 57, 59, 301/61, 104, 110.5, 110.6, 80, 83–84; 29/894.33, 894.333

(56) References Cited

U.S. PATENT DOCUMENTS

| | | | | |
|---|---|---|---|---|
| 23,695 A | * | 4/1859 | Murphy | 301/79 |
| 117,902 A | * | 8/1871 | Loughridge | 301/59 |
| 298,632 A | * | 5/1884 | Smith | 152/5 |
| 338,988 A | * | 3/1886 | Little | 29/894.333 |
| 348,605 A | * | 9/1886 | Wilson | 301/59 |
| 356,643 A | * | 1/1887 | Howell | 301/59 |
| 369,641 A | * | 9/1887 | Howell | 301/59 |
| 377,579 A | * | 2/1888 | Savene | 301/59 |
| 378,961 A | * | 3/1888 | Hughes | 301/61 |
| 406,705 A | * | 7/1889 | Crecelius | 301/59 |
| 413,949 A | * | 10/1889 | Mark | 301/61 |
| 420,075 A | * | 1/1890 | Kennelly | 301/79 |
| 473,837 A | * | 4/1892 | Green | 301/6.5 |
| 528,887 A | | 11/1894 | Myers | |
| 901,568 A | * | 10/1908 | Verplanck | 301/79 |
| 918,118 A | * | 4/1909 | Blean | 301/59 |
| 941,029 A | | 11/1909 | Murray | |
| 1,464,566 A | | 8/1923 | Ford | |
| 3,865,220 A | * | 2/1975 | Thompson, Jr. | 192/46 |
| 4,483,729 A | * | 11/1984 | Fujisaki et al. | 156/222 |
| 4,978,176 A | * | 12/1990 | Smith | 301/104 |
| 5,487,592 A | | 1/1996 | Rasmussen | |
| 5,531,510 A | * | 7/1996 | Yamane | 301/110.5 |
| 6,189,978 B1 | * | 2/2001 | Lacombe et al. | 301/104 |
| 6,520,595 B1 | * | 2/2003 | Schlanger | 301/59 |

FOREIGN PATENT DOCUMENTS

| | | |
|---|---|---|
| EP | 0 790 141 | 8/1997 |
| FR | 2 324 471 | 4/1977 |
| WO | 93/09963 | 5/1993 |
| WO | 00/35683 | 6/2000 |

OTHER PUBLICATIONS

Patent Abstracts od Japan, vol. 007, No. 128 (M–220), Jun. 3, 1983 & JP 58 047602A (Daidou Kogyokk), Mar. 19, 1983.

* cited by examiner

*Primary Examiner*—Russell D. Stormer
*Assistant Examiner*—Jason R. Bellinger
(74) *Attorney, Agent, or Firm*—Robert Bachman, P.C.

(57) ABSTRACT

The vehicle wheel includes an outer rim hoop with means for holding a tire, a plurality of spoke portions, and a central hub assembly. The central hub assembly includes an axle assembly and a hub shell that is rotatable about the axle. The hub shell includes at least two axially spaced outer flanges for attachment with the spokes. The spokes are connected at their outer ends to the rim hoop and at their inner ends to their respective outer flange. Firm attachment between the spoke and the outer flange is achieved by engaging of a portion of the spoke with a cavity formed within at least one of the rim and the outer flange. Also disclosed are attachment arrangements that include an intermediate connection member to facilitate attachment between the spoke and the cavity.

10 Claims, 21 Drawing Sheets

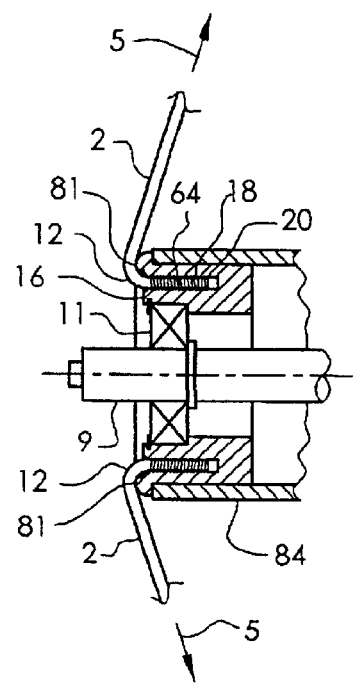
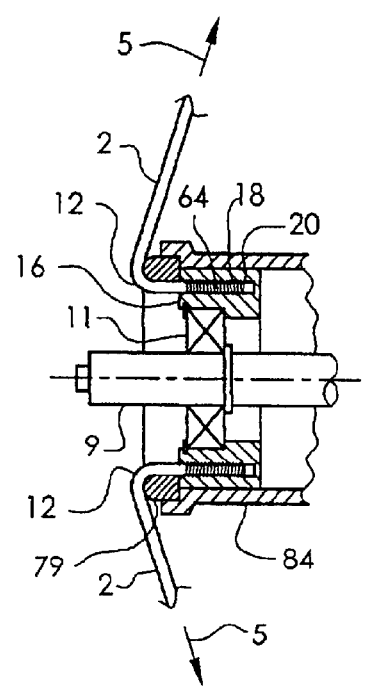
Fig. 8a　　　　Fig. 8b
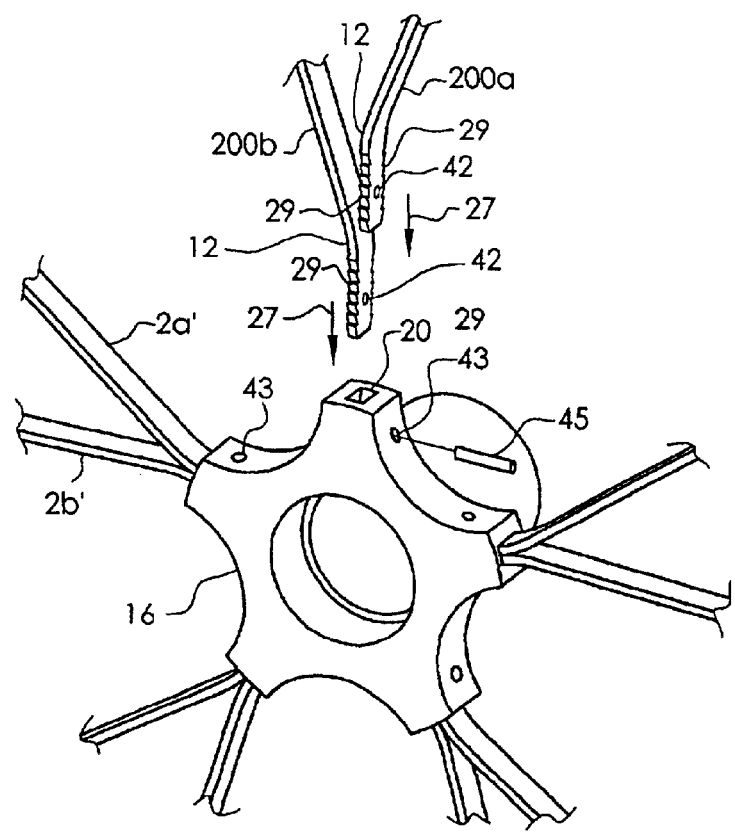
Fig. 8c

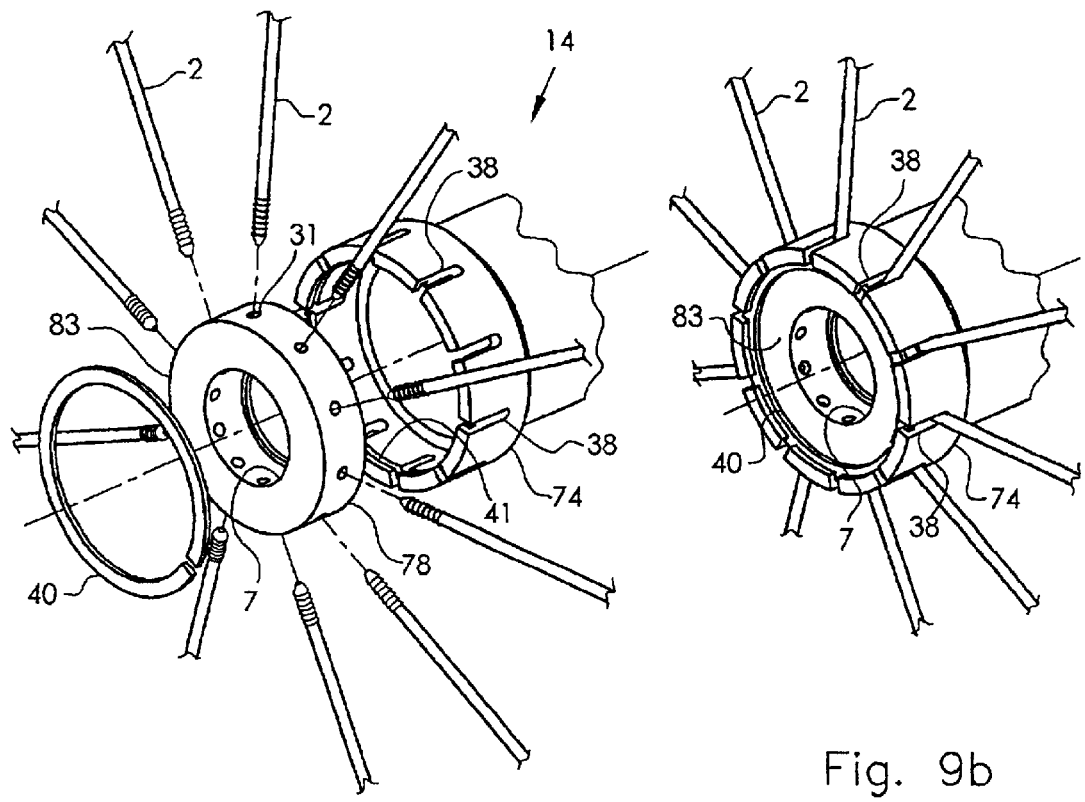
Fig. 9a
Fig. 9b
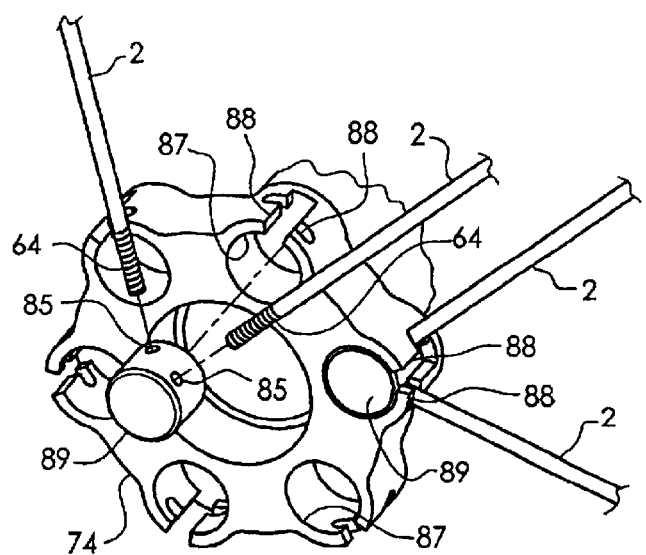
Fig. 9c

US 6,899,401 B2

VEHICLE WHEEL INCLUDING SPOKE ATTACHMENT

CROSS-REFERENCE TO RELATED APPLICATION

This application is a Continuation-In-Part of U.S. patent application Ser. No. 09/210,973, filed Dec. 14, 1998 now U.S. Pat. No. 6,520,595.

BACKGROUND OF THE INVENTION

This invention relates to vehicle wheels, specifically to the connection between the spoke and the hub and between the spoke and the rim.

Heretofore, the vast majority of bicycle wheels have been constructed using steel wire spokes that are connected, at their inner end, to a central hub component and, at their outer end, to a metallic rim hoop. The spokes are generally of steel construction while the hub and rim may be of aluminum or steel construction. The spokes, hub and rim are each formed as separate components that are then joined together with mechanical connections.

The manufacture of the hub component is an expensive process. Some hub shells are machined from aluminum billet while others are cast or forged and subsequently machined. This machining operation generally requires at least three machining setups: first the cylindrical portions of the hub are turned on lathe, second, the spoke holes in one hub flange are drilled in a rotary index operation, and third, the opposite hub flange is drilled in a separate rotary index operation as well. This multi-step machining process adds considerable expense to the manufacture of the hub shell component.

The tensile forces within the spoke create relatively high stresses at their connection points and these connection points must therefore be capable of withstanding these stresses. In the conventional spoke connection arrangement, stresses due to the spoke tension are concentrated over a relatively small region of the hub flange, namely the portion of the hub flange material that is radially outward from the spoke hole. This requires that the hub flange construction be based on expensive, higher strength materials and the use of more expensive forming processes, such as forging, rather than less costly processes, such as die casting or injection molding. Further, these stresses require that the flange be designed with robust thickness, thus adding weight to the wheel assembly.

The spokes of most conventional wheels are constructed of steel wire with a sharp "J" bend close to the headed end and adjacent to the point where they pass through the hole in the flange. The "J" bend region of the spoke is considerably weaker and less ductile due to the overstress of the material to achieve this bend. As would be expected, the "J" bend region is a common breakage point for spokes of conventional design. Spoke manufacturers have attempted to compensate for this shortcoming by thickening the wire in this region, but this solution results in considerable extra expense and weight.

It is often an objective to construct wheels with spokes that are flattened along their length to create a more aerodynamic cross-section profile. With a conventional hub flange, this creates a problem where the extra wide spoke cross section must pass through the round hole in the hub flange. The common assembly method, when flattened spokes are utilized, requires the slotting or notching of each individual spoke hole in the two hub flanges to allow the spoke to pass through. This additional operation adds considerable expense and weakens the hub flange as well.

With conventional wheels, the spoke is simply passed through the flange hole until the head of the spoke contacts the edge of this hole. The result is a loose clearance fit between the hub flange and the spoke, which permits the spoke to squirm and shift inside this hole. This undesirable movement results in wear at the flange and additional flex at the rim and also causes the wheel to come out of alignment (true) rather easily.

Due to fabrication methods employed in conventional hub construction, it is very difficult to machine or otherwise create the details required to insure that the geometry of the hub flange conform to the spoke surface without any clearances. Such clearances allow flexure or movement under tensile loading of the spoke. Further, it is common practice for the builder of conventional wheels to manually bend the spokes in an attempt to conform the spoke to the hub flange and align the spoke in its direction toward the rim. This is obviously a compromise since, particularly in the case of bicycle wheels, the rim is of relatively light construction and any inconsistency in spoke tension or spoke flexure characteristics will cause the wheel to go out of true, or worse, will cause spoke breakage. When the tensile loads are not evenly shared by all of the spokes, the spokes with greater stresses will be more prone to breakage as will the portions of the rim and hub flange associated with these spokes.

In recent years, some attempt has been made to improve on this conventional wheel design, but the changes have been minor and still retain the same materials and basic configuration. Interestingly, many of these more modern designs are simply a rehash of inventions that are more than 80 years old. This is likely due to the fact that, aside from some more esoteric examples, these modern wheels rely on similar materials and construction techniques as those employed 80 years ago.

Accordingly, it is an objective of the present invention to overcome the forgoing disadvantages and provide an improved vehicle wheel with improved spoke attachment.

SUMMARY OF THE INVENTION

In accordance with the present invention, it has now been found that the forgoing objects and advantages may be readily obtained.

The wheel of the present invention comprises: a peripheral wheel rim; a central wheel hub with a central axle and an outer flange; a plurality of spokes extending between the rim and hub, wherein said spokes have a first portion connected to said rim and a second portion opposed to said first portion; with and connected to said hub; a cavity formed within at least one of said outer flange and said rim for connection with at least one of said spokes; wherein at least one of said first portion and said second portion of said spoke is joined to at least one of said outer flange and said rim by means of a deformed engagement in a deformed engagement region; and wherein said joinder results in a firm connection between said cavity and at least one of said first portion and said second portion of said spoke at said engagement region.

The present invention obtains many advantages. It is an advantage of the present invention is the reduction in cost through the ability to utilize inexpensive and efficient manufacturing techniques in the production of component parts.

The hub and hub flange of the present invention may be produced using 'net shape' molding techniques that reduce or eliminate the need for expensive machining operations.

Since this design is well suited to such molding or casting operations, the desired hub geometry may be produced with few, if any, secondary machining operations. In the case where subsequent machining is required, far fewer of these costly operations are anticipated than if the hub were produced from a billet or a forging. Further, in such a "net shape" forming operation, the amount of material waste is greatly reduced, particularly when compared to a part that is fully machined from billet.

While some existing wheel designs terminate the spoke in a pre-threaded hole in the hub flange, these tapping and threading operations are time consuming and expensive operations. The present invention allows the spoke to be anchored to a straight smooth cavity located in the rim or hub. Drilling or molding a straight and smooth cavity is far less expensive than providing a pre-threaded hole.

Since the spoke tension stresses of the present invention are distributed over a wider region of the hub flange interface, stresses are reduced within the hub flange material. Thus the strength requirements for the hub flange material are reduced and lower performance materials may be utilized, further reducing the cost as compared with conventional hubs. For example, the hub flange of the present invention may now be formed from relatively inexpensive polymer resins. These materials also lend themselves to lower-cost forming operations such as plastic injection molding. If a metallic hub flange is deemed necessary, high strength billet alloys are no longer required. Lower-strength metal casting alloys, which may be formed using a casting process such as die-casting, will likely have sufficient strength.

The present invention is uniquely applicable to arrangements wherein the hub flange and/or rim are formed from polymeric materials. Many of these materials, especially engineering polymers, exhibit good strength characteristics and are relatively inexpensive and easy to mold. Heretofore, these materials have not been used successfully applied in hub flange and rim applications because they do not exhibit sufficient hardness to withstand the high contact stresses associated with conventional spoke attachment technology. The present invention describes a longitudinal engagement between the spoke and the hub flange or rim. Such a longitudinal engagement increases the contact area and reduces the contact stress, making such polymer materials the preferred choice for forming the rim and/or hub flange.

Also, fiber reinforced injection molding compounds may now be utilized in the present invention. With these high strength composite polymers, the injection molding process permits the fibers to attain a generally random orientation within the matrix. This is a significant benefit that would not apply if the hub were machined from a fiber reinforced plastic billet. Fiber reinforced billet is normally produced by an extrusion process where the fibers become highly aligned in the direction of extrusion. Thus, a hub shell machined from such a billet would have relatively low strength perpendicular to the direction of extrusion.

Some of the embodiments of the present invention also illustrate the ease with which duplex spokes may be incorporated into the present invention. These duplex spokes create the equivalent of two individual spokes using only a single series of manufacturing operations and are thus less expensive to produce.

The spokes of a conventional wheel are each produced as single components and require very specific and accurate geometry to mate with the conventional hub flange. However, the spokes of the present invention are easier to produce. In many cases, manufacturing operations such as the bending or heading of the spokes are eliminated, thereby reducing the expense.

Since the cavities of the present invention may be formed in a mold, rather than drilled, the cross section of the cavity may be produced in any shape desired. This is particularly useful in adapting the cavity to flattened aerodynamic spokes.

An additional advantage of the present invention is the production of a wheel that is light in weight and high in strength and reliability.

In an effort to enhance the performance of the bicycle, designers have continually aimed toward reducing the weight of its components while maintaining the strength and reliability that the marketplace requires. This is particularly true of the rotating components, such as the wheel, since any weight reduction reduces the rotational inertia as well as the static mass of the bicycle.

Due to its relaxed strength requirements, the present invention permits the use of lightweight materials to produce the hub flange component. Thus, materials such as polymers, reinforced polymers, magnesium, aluminum, among others, may now be used to construct the hub flange, saving precious weight.

Additionally, since the present invention permits the use of net-shape molding operations, the hub flange may now be produced to include far more intricate geometry than would be realistic for a hub that is machined from billet. This allows the designer to eliminate material from the hub flange in the locations where it is not required, further saving precious weight.

Many of the embodiments of the present invention illustrate the use of additional preformed components incorporated within the overmolding hub flange material. This allows additional components such as a preformed reinforcement or a preformed intermediate connection member to be incorporated into the design. Thus, the hub shell may be of hybrid construction and composed of several components, where each component is made from a material that particularly suits its function. For example, this allows the designer to locate components made from higher strength materials specifically where they are needed to achieve the greatest structural efficiency with the minimum weight.

As illustrated in many of the embodiments of the present invention, the sharp J-bend of traditional spokes may eliminated with the present invention, thereby eliminating a region where the spoke material is highly stressed and prone to failure.

The engaged spoke connection of the present invention results in a hub flange or rim that is conformed or matched to the geometry of the spoke to support the connection therebetween. Therefore the spoke tensile loads produce little or no relative movement or squirm between the spoke and the hub flange or rim. The exposed portion of the spoke extends to its connection at the rim in a straight and aligned direction. Thus spoke tensile forces may now be evenly shared among the spokes of the wheel, resulting in a stronger, more reliable wheel that is less prone to broken or worn components and is far more effective at maintaining trueness and rim alignment.

Further objects and advantages of my invention will become apparent from considering the drawings and ensuing description.

BRIEF DESCRIPTION OF THE DRAWINGS

The present invention will be readily understandable from a consideration of the accompanying drawings, wherein:

FIG. 2b is a cross-section view of the prior art bicycle wheel as seen generally in the direction 15—15 of FIG. 2a;

FIG. 8a is a partial view of the hub region of an embodiment of the present invention in schematic illustration, with the hub flange shown in axial cross-section, including a non-aligned hub flange cavity and bent spoke;

FIG. 8b is a partial view of the hub region of an embodiment of the present invention in schematic illustration, with the hub flange shown in axial cross-section, similar to FIG. 8a, including a spoke guide ring component to support the bent spoke;

FIG. 8c is a partial perspective exploded view of an embodiment of the present invention, schematically illustrating the assembly of two spokes assembled to a single cavity;

FIG. 9a is a partial perspective exploded view of an embodiment of the present invention, schematically illustrating the assembly of the spokes, a hub flange and an intermediate hub flange;

FIG. 9b is a partial perspective view of the embodiment of FIG. 9a, schematically illustrating the assembled components;

FIG. 9c is a partial perspective exploded view of an embodiment of the present invention, schematically illustrating the assembly of the spokes, an intermediate hub flange and a spoke joining member;

DETAILED DESCRIPTION OF PREFERRED EMBODIMENTS

Figure 1:
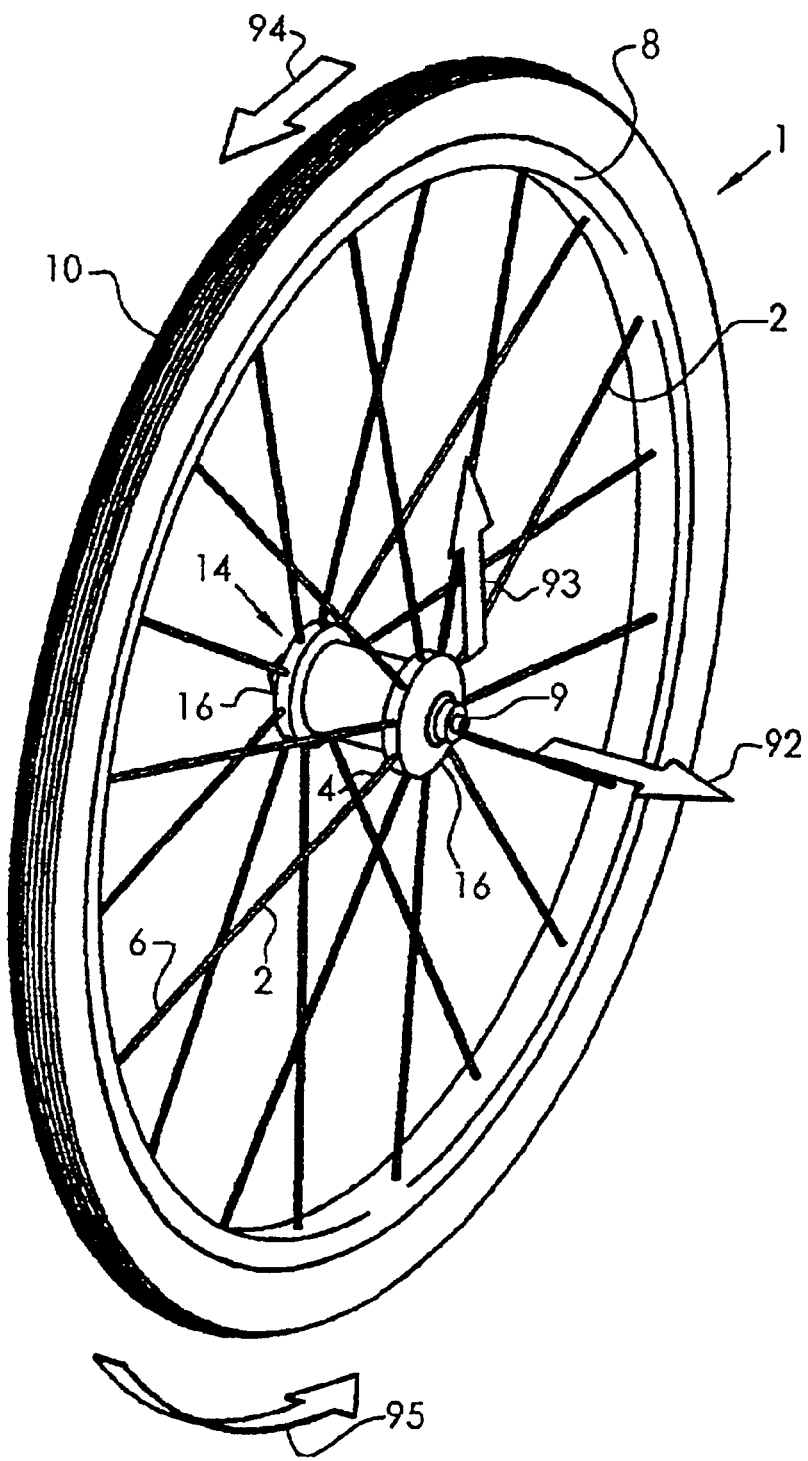
FIG. 1 is a perspective view schematically illustrating the general configuration of a vehicle wheel as applied to a bicycle wheel.

FIG. 1 describes the basic configuration of a vehicle wheel, in particular, a bicycle wheel 1 as well as a description of the direction conventions used throughout this disclosure. The hub shell 14 is rotatable about the axle 9 and includes at least two axially spaced hub or outer flanges 16, each of which include a means for connecting with the spokes 2. The hub flange 16 may be contiguous with the hub shell 14 or it may be separately formed and assembled to the body of the hub shell 14. The spokes are affixed to the hub flange 16 at their first end 4 and extend to attach the rim 8 at the second end 6. The tire 10 is fitted to the outer periphery of the rim 8. The axial direction 92 is any direction parallel with the axis of the axle 9. The radial direction 93 is a direction generally perpendicular to the axial direction 92. The tangential direction 94 is a direction within the plane of the rim 8 and perpendicular to the radial direction 93. The circumferential direction 95 is a cylindrical vector that wraps around the axial direction 92 axis at a given radius. While it is most common for the hub shell 14 to rotate about a fixed axle 9, there are some cases where it is desirable to permit the axle 9 to rotate with the wheel 1 such as the case where the wheel 1 is driven by the axle 9.

Figure 2A:
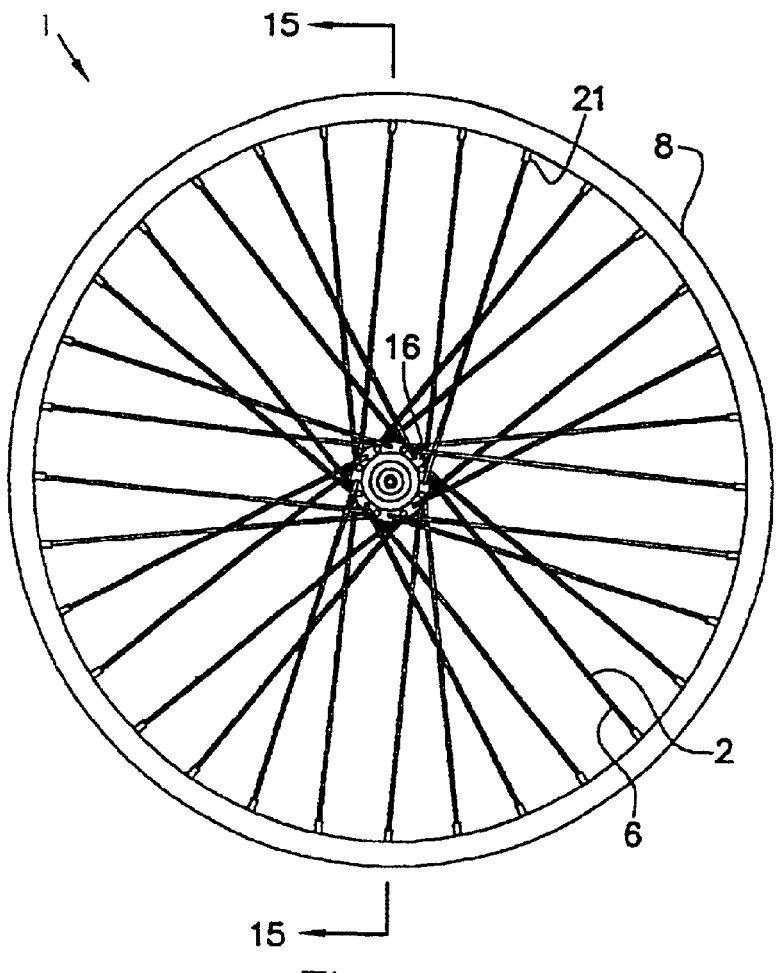
FIG. 2a is an axial plan view illustrating a prior art bicycle wheel.
Figure 2B:
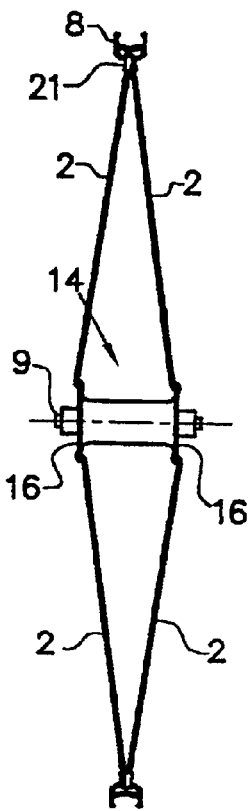
Figure 2C:
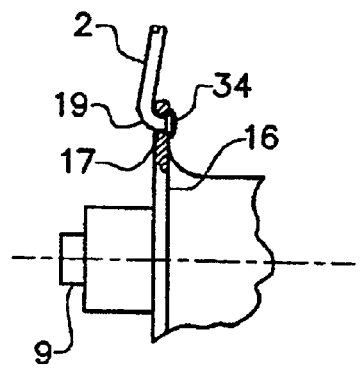
FIG. 2c is a fragmentary view detailing the view illustrated in FIG. 2b where the hub flange is shown in a partial cross-section to illustrate connection with the spoke.

FIGS. 2a, 2b and 2c describe the current technology in conventional bicycle wheels that most cyclists are familiar with. This prior art wheel 1 design includes a rim 8, a hub shell 14 and a plurality of spokes 2. The hub shell 14 is rotatable about the axle 9 and includes a pair of axially spaced hub flanges 16. The wheel is assembled by first threading each individual spoke 2 through an axial hole 17 in the hub flange 16 until the j-bend 19 is hooked within the hole 17. The spoke 2 is then pivoted to extend in a generally radial direction toward the rim 8. The enlarged portion 34 or "head" of the spoke 2 prevents the spoke 2 from pulling through the hole 17 in the hub flange 16. Thus, the contact area between the spoke 2 and the hole 17 is quite small and is limited to the region of the hub flange 16 at the edge of the hole 17 that contacts the head 34 as well as a tiny edge contacting the inside of the j-bend 19. It should be noted that such a small contact area results in exceptionally high contact stresses in the hub flange 16 material. It is common that, even with expensive high strength aluminum alloy hub flange 16 materials, the spoke 2 significantly deforms the hole 17 at these contact points. The second end 6 of each spoke 2 is then fixed to the rim 8 via spoke nipples 21. Tightening the threaded engagement between the spoke nipple 21 and the spoke 2 serves to effectively shorten the length of the spoke 2. Thus, as the nipples 21 are tightened, the spokes 2 are drawn up tight and a degree of pretension is induced in the spoke 2. By selectively adjusting this threaded engagement, the spoke pretension may be adjusted to align the trueness of the rim 8. The spoke pretension is resisted by circumferential compression of the rim 8 and it is this balance of forces that imparts efficient structural integrity to the bicycle wheel 1.

The present invention relates to the connection arrangement between the spokes 2 and the hub 14 and/or rim 8. More specifically, the present invention involves the connection between the hub flange 16 and/or rim 8 and a spoke 2 or plurality of spokes 2, where the spoke 2 is a preformed structural element. This spoke 2 connection involves a bore or cavity in the hub flange 16 or rim 8 to accept the spoke. As the spoke 2 is introduced into the cavity, the walls of the cavity are deformed to conform to the surface of the spoke such that the spoke becomes firmly engaged within the bore, creating a firm connection therebetween. Alternatively, the cavity of the hub flange may be designed to deform the spoke upon assembly between the spoke and hub flange to create a firm connection therebetween. A further alternative arrangement is specific to the use of polymer material surrounding the cavity that does not require deformation of either the cavity or the spoke. Instead, the spoke and the cavity each include matched configured surfaces such that the configured surface of the spoke is engaged to the configured surface of the cavity to create a firm connection therebetween.

Figure 3:
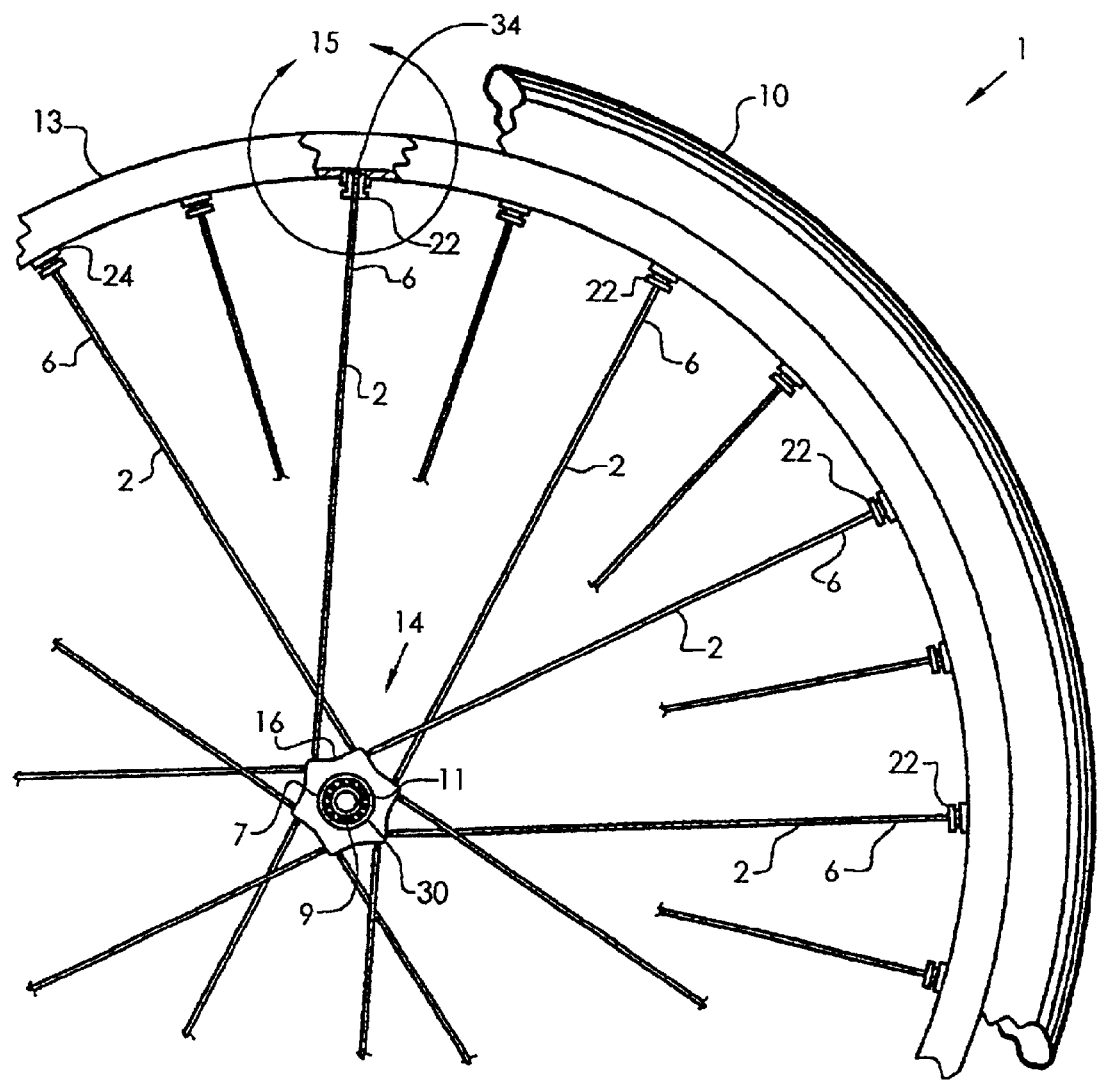
FIG. 3 is a fragmentary axial plan view illustrating a schematic representation of an embodiment of the present invention.

FIG. 3 describes a basic embodiment of the present invention in plan view. The wheel 1 includes spokes 2 that are connected at their second ends 6 to the rim 13 via threaded collars 22. Threaded collars 22 engage the head 34 of the spoke 2 to permit the length of the spoke 2 to be adjusted to provide for proper spoke 2 tension and also to allow for a removable connection between spoke 2 and rim 8. This connection arrangement is described in further detail in FIGS. 10a–b. The tire 10 is mounted to the rim 8 in the standard manner and the hub shell 14 is rotatable about the axle 9 via the bearings 11, including an outer bearing race 30 that is seated in the bearing bore 7 of the hub flange 16. At their inner end, the spokes 2 are threaded into blind cavities 20 of the hub flange 16, to provide firm anchoring in an arrangement as described in FIGS. 4a–c. For the purposes of using conventional terminology, the term "hub flange" is used to describe a region of the hub shell 14 to which the spokes 2 are joined. While the surface of the hub flange may be raised and flange-like in comparison to other surfaces of the hub shell 14, this is not a requirement for the present invention and the hub flange 16 may indeed be flush or recessed relative to other hub shell surfaces.

It is easiest to mold or otherwise form or fabricate the individual hub flanges 16 separately and then assemble these hub flanges 16, along with other components as required, to create a complete hub shell 14. This hub shell 14 assembly may be permanent or else it may be removably assembled, allowing the hub flange 16 to be disassembled from the hub shell 14 for servicing in the field. However, it is also anticipated that the hub shell 14, including a multiple of hub flanges 16, may be molded or formed together as a unit.

As is well known in the art, a wheel 1 may be of tension-spoke construction, where the central hub hangs in tension by the spokes from the rim portion directly above, or it may be of compression-spoke construction, where the hub is supported by compressing the spoke directly beneath it. Since the present invention is directed toward bicycle wheels and since the tension-spoke wheel is generally a more efficient structure, most of the discussion herein is focused with an eye toward tension-spoke wheel construction. However, it is anticipated that most, if not all, of the embodiments of the present invention may be applied to compression-spoke wheel construction as well. For a tension-spoke wheel, it is preferable that the wheel includes at least two hub flanges that are axially spaced on either side of the rim or, more specifically, the spoke attachment points at the rim. Thus the spokes fixed to opposite hub flanges will converge as they extend to the rim as illustrated in FIG. 2b. Additionally, a tension spoke wheel will usually be pretensioned during assembly to create a pretensioned structure of balanced spoke tension that allows the axle loads to be distributed among several, if not all, of the spokes of the wheel. It is this ability to share the stresses among its spokes that helps to make the tension spoke wheel the highly efficient structure that it is.

Figure 4C:
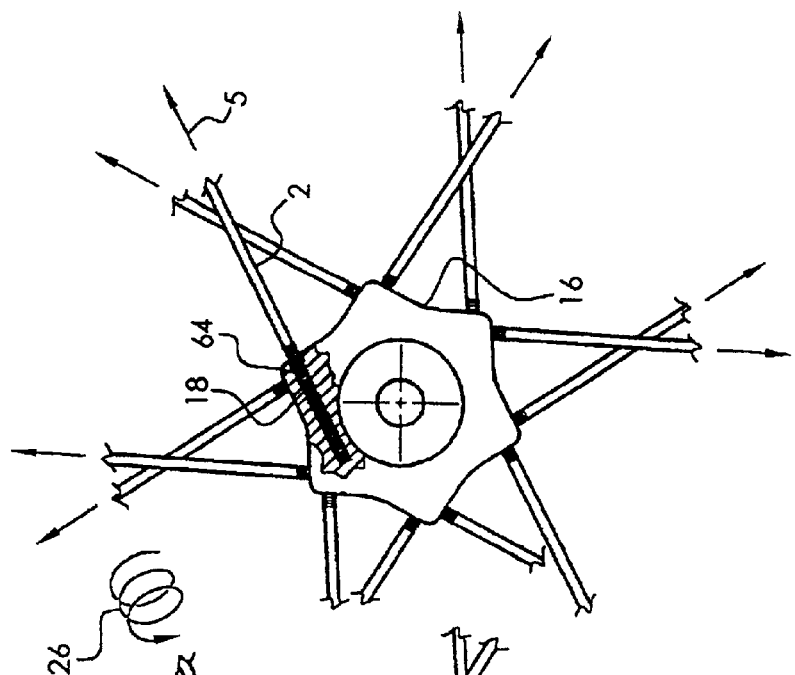
FIGS. 4a–c show the hub region of an embodiment of the present invention in schematic illustration and in axial plan view, with the hub flange shown in partial cross-section to reveal a hub flange cavity, describing the spoke installation sequence for a spoke with a helical thread.
Figure 4B:
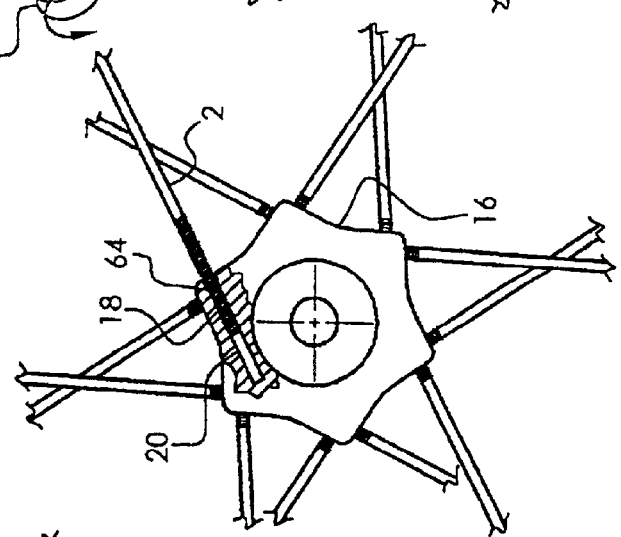
Figure 4A:
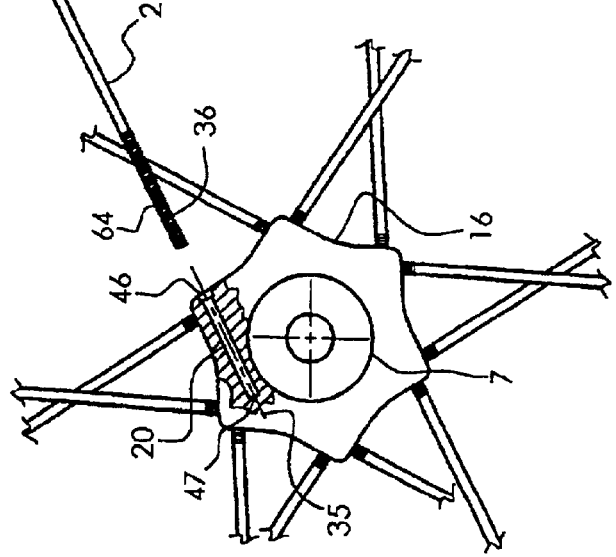

FIGS. 4a–c describe the method by which the spokes 2 of FIG. 3 are affixed to the hub flange 16. The hub flange 16 includes at least one blind cavity 20 that is open at one end 46 and is closed along its cylindrical sidewalls and its closed end 47. The cavity 20 shown here is a straight longitudinal cavity 20 with a longitudinal axis 35. Although only one cavity 20 is detailed here, the hub flange 16 of FIGS. 4a–c preferably includes several such cavities 20, each to be mated with a corresponding spoke 2. The spoke 2 includes a configured portion 36 in the form of a threaded portion 64 such that the major diameter of the threaded portion 64 is larger than the corresponding cylindrical sidewall diameter of the cavity 20. FIG. 4a shows the spoke 2 prior to assembly with the cavity 20. As the threaded portion 64 of the spoke 2 is introduced to the open end 46 of cavity 20, the spoke 2 is twisted, as indicated by arrow 26, so as to thread the threaded portion 64 into the cavity 20 as described in FIG. 4b. As the threaded portion 64 is threaded into the cavity 20, the cylindrical sidewalls of the cavity 20 are at least partially deformed to conform to the contour of the threaded portion 64 of the spoke 2 in a thread-forming or self-tapping operation that is well known in industry. Although it may not be required to thread the spoke 2 to the full cavity 20 depth, it is usually desirable to bottom the threaded portion 64 against the closed end 47 to provide a consistent depth stop in assembly as shown in FIG. 4c. Thus an engaged portion 18 of spoke 2 is now created to include the depth of engagement between the threaded portion 64 and the cavity 20. The spoke 2 may now extend from its engaged portion 18 with the cavity out to its connection at the rim 13.

For such an engagement, it is preferred that the hub flange 16 is made of a softer material, such as a glass filled nylon, and that the spoke 2 is made of a harder material, such as stainless steel. It is also envisioned that the hub flange 16 may be constructed from a wide range of materials, including lightweight metals such as aluminum or magnesium. The main criteria is that the spoke 2 material must be harder than the hub flange 16 material so that the cavity 20 may be deformed by the spoke 2. The hub flange 16 material surrounding the cavity 20 is thus deformed through either plastic or elastic deformation or, most likely, some combination of the two. With polymers in particular, the flange 16 material surrounding the cavity 20 undergoes both plastic and elastic deformation. The plastic deformation results in the conformed engagement of the cavity 20 to the threaded portion 64 of the spoke while the elastic deformation also adds a gripping action between the cavity 20 and the spoke 2 to prevent unthreading. Although the plasticity of most materials will increase somewhat at higher temperatures, the present invention does not require a softening or melting of the material surrounding the cavity 20 to achieve this deformation. As shown here, the material surrounding the cavity 20 exhibits "cold flow" where it deforms to conform, at least partially, to the contour of the spoke 2 while this material remains in a solid state. Several polymeric materials from the family of crystalline and semi-crystalline thermoplastics are especially well suited for this type of application since they generally have an inherent lubricity to aid in the deforming insertion of the spoke.

Thus it may be seen that this self-tapping engagement between the spoke 2 and the hub flange 16 provides a firm connection between the two to resist spoke tension forces 5 as well as resisting any relative movement. The threaded engagement between the spoke 2 and the cavity 20 sidewalls constitutes a continuous helical engagement that occurs over at least a portion of the length of the engaged portion 18 of the spoke 2 to distribute these spoke tension forces 5 over a broad area of the hub flange 16 material, thereby reducing the associated contact stress significantly as compared to the prior art assembly described in FIGS. 2a–c. In other words, the engagement described here is a longitudinal engagement that acts along the longitudinal axis of the spoke 2. This longitudinal engagement distributes the spoke tension loads and the associated stresses over a longitudinal length, rather than focusing these loads at a small point of contact as with conventional prior art wheel assemblies. It may be termed that a longitudinal engagement includes at least two engagement locations that are longitudinally spaced along the longitudinal axis of the spoke. It is generally desirable that the longitudinal length of such an engagement be greater than the cross-sectional thickness of the spoke to create an effective engagement. Obviously, increasing the length of engagement will increase the load carrying capacity of the connection.

It should also be noted that this threaded connection permits a removable assembly between the spoke 2 and the hub flange 16. This is desirable, since it is usually preferable that the spokes 2 be replaceable in the field. The first time that the spoke 2 is threaded into a smooth cavity 20, threads are formed in the cavity 20 by plastically forming a mating thread. However, the elastic portion of this deformation will spring back when the spoke 2 is unthreaded. Subsequent reassembly will again elastically deform the cavity 20 for fitment of the spoke 2.

Figure 16:
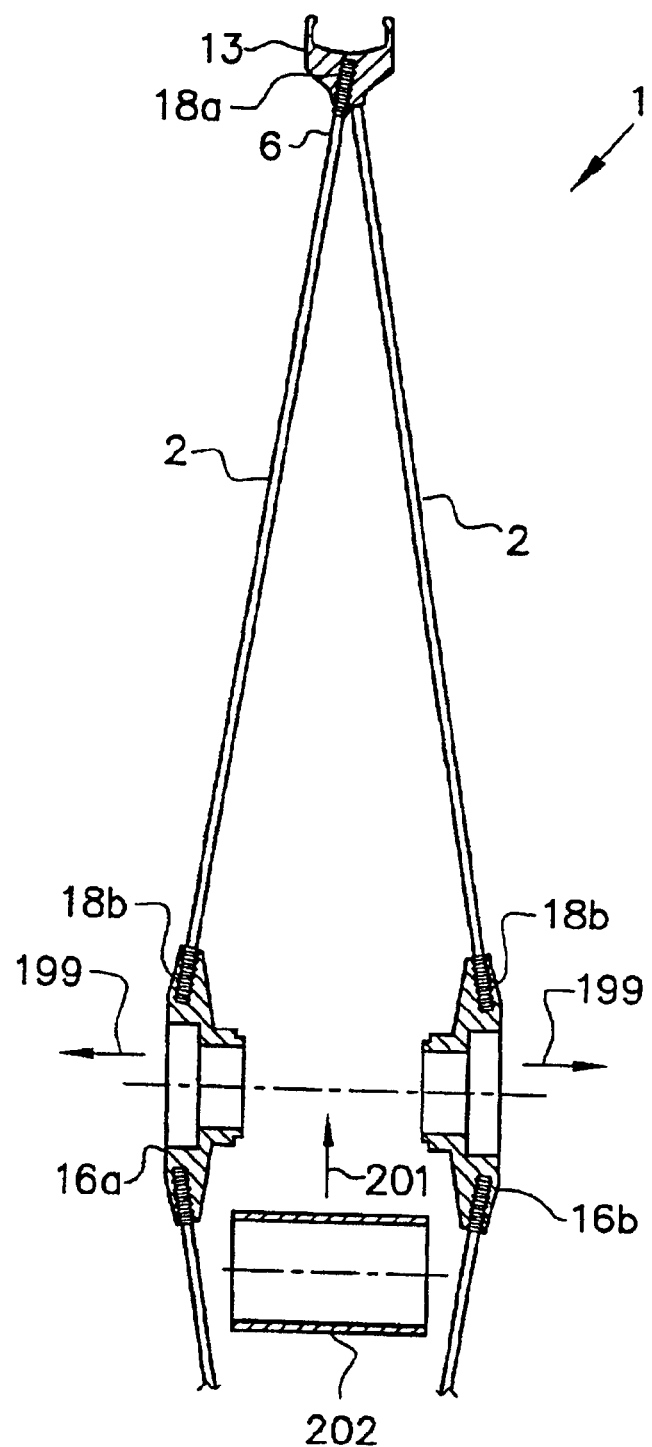
FIG. 16 is a partial cross section view taken in an axial plane of an alternative embodiment of the present invention describing a method of tensioning fixed-length spokes.

It should be further noted that the cavity 20 is aligned with the spoke 2 such that the spoke extends directly from the cavity 20 toward its connection point at the rim (not shown). While the axial plan view is shown here, it is desirable that the cavity extends with an axial component of orientation as well to direct the spoke in straight alignment as it extends to the rim. Such an axial cavity alignment is illustrated in FIG. 16.

Figure 5B:
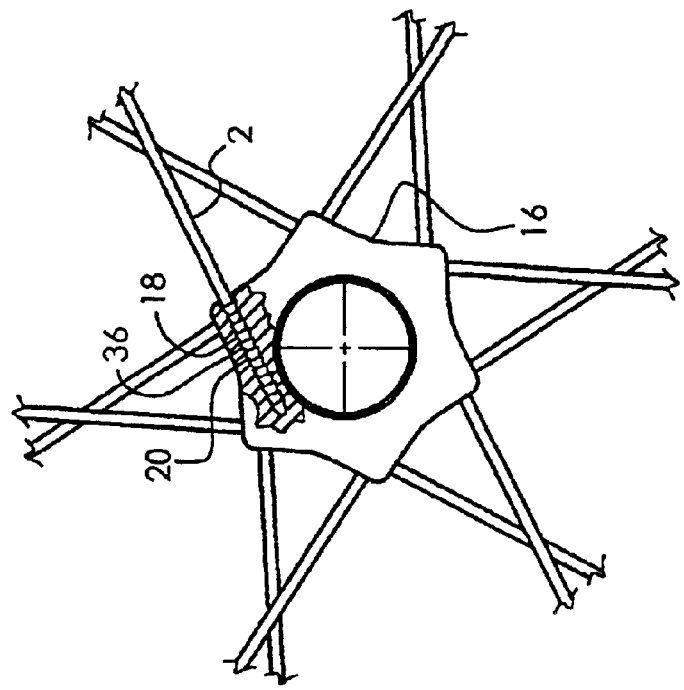
FIGS. 5a–b show the hub region of an embodiment of the present invention in schematic illustration and in axial plan view, with the hub flange shown in partial cross-section to reveal a hub flange cavity, describing the stages of the spoke installation sequence for a spoke with a raked edge.
Figure 5A:
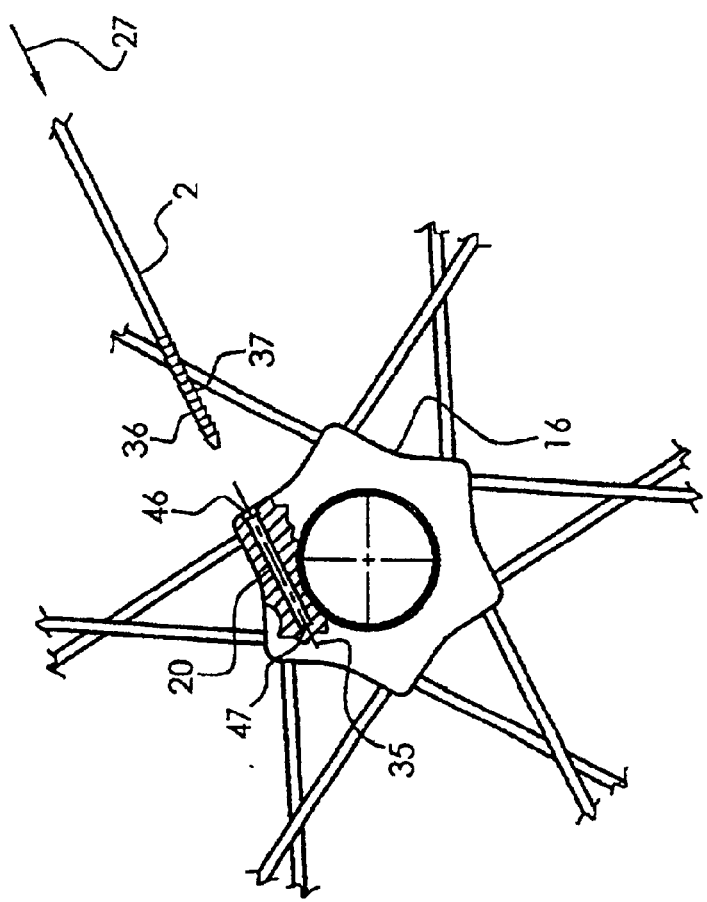

FIGS. 5a–b shows an alternate method of assembling the spoke 2 to the hub flange 16. As shown in FIG. 5a, spoke 2 includes raked edges 37 that constitute a configured portion 36. The tips of the raked edges 37 form a larger dimension than the corresponding dimension of the sidewalls of cavity 20. Thus, an interference fit is created between the cavity 20 and the configured end 36. As shown in FIG. 5b, the spoke 2 is then simply pushed longitudinally into the cavity along the axis of the spoke as indicated by arrow 27. The walls of the cavity 20 are then deformed to conform to the configured portion 36. As shown, the raked edges 37 permit easy insertion of the spoke 2 into cavity 20 in the direction of arrow 27, but resist pull-out in a "Christmas tree" type of engagement. Obviously, resistance to pull-out is a particularly important prerequisite for tension-spoke wheels. While such raked edges 37 are a desirable profile for configured portion 36, other profiles may be employed in such an arrangement where spoke 2 insertion is longitudinal. In addition, it is desirable that the configured portion 36 employs some type of longitudinal groove or other non-circular geometry so that, when inserted, the spoke 2 will resist twisting. It is further envisioned that some combination of the embodiment of FIGS. 4a–c and FIGS. 5a–b may be employed whereby the thread profile of the threaded portion may be a raked profile to allow for straight longitudinal insertion of the spoke 2 as well as the capability to be threadably withdrawn from cavity 20.

Close inspection of the knurled portion 36 of FIGS. 5a–b reveals that the raked edges 37 are, in fact, a series of annular rings. Thus, the deformation of the cavity 20 is a ring-shaped deformation around the sidewalls of cavity 20 and the result is a series of discreet longitudinally spaced deformation engagement sites corresponding to the ring-shaped peaks of the raked edges 37. A single such deformation engagement site provides very little stress distribution area, resulting in high contact stresses between the connected elements, whereas two or more longitudinally spaced engagement sites will significantly reduce this contact stress. For a given hub flange 16 material and spoke cross-section, contact stress may be reduced and resistance to spoke pull-out may be increased by increasing the number or length of these deformation engagement sites and/or by increasing their depth of deformation engagement. As a general rule, it is desirable that the longitudinal length of engagement that is encompassed by longitudinally spaced engagement site be greater than the cross-sectional thickness of the spoke 2. It is this reduction of contact stress that permits softer and weaker hub flange 16 materials, such as polymeric materials, to be employed in such a hub flange application. As opposed to most metals, polymeric materials exhibit a relatively high level of creep when subjected to elevated stress levels. Thus, this longitudinal engagement reduces this stress and is particularly applicable to hub flanges of polymer construction. Heretofore, a longitudinal spoke engagement has not been applied in a polymer hub flange design and polymeric materials have never been successfully applied to hub flange applications, particularly in a tension spoke wheel assembly.

Figure 6A:
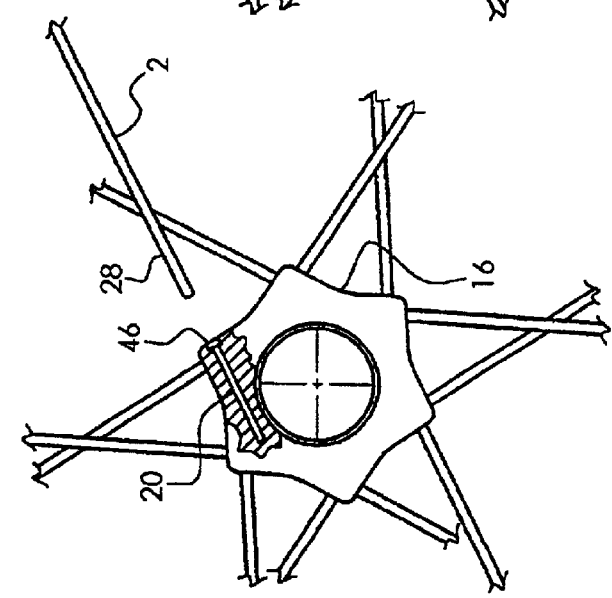
FIGS. 6a–b show the hub region of an embodiment of the present invention in schematic illustration and in axial plan view, with the hub flange shown in partial cross-section to reveal a hub flange cavity, describing the stages of the spoke installation sequence for a smooth spoke.
Figure 6B:
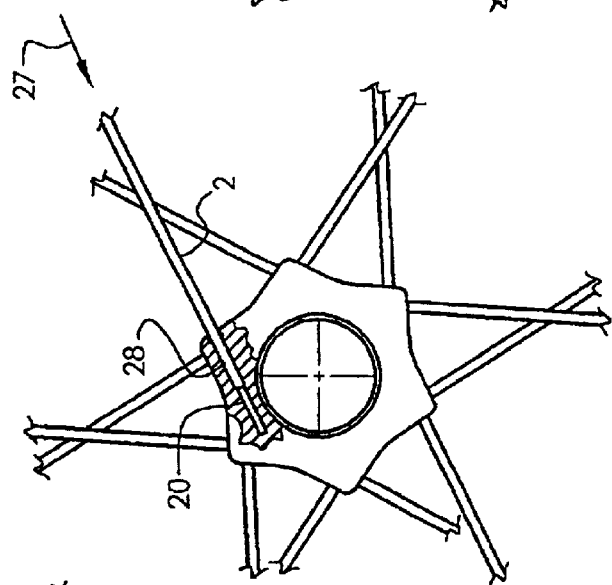
Figure 6C:
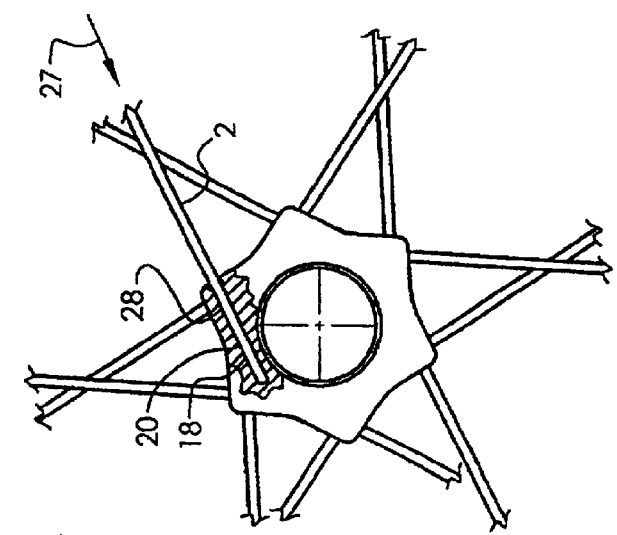

FIGS. 6a–c show the spoke 2 of FIGS. 5a–b without a configured surface. In this embodiment, there is merely a smooth interference-fit engagement between the spoke 2 and the cavity 20. As shown in FIG. 6a, prior to spoke insertion, the diameter of the spoke 2 end is of a larger cross-sectional dimension than the corresponding dimension of cavity 20. FIG. 6b shows the spoke partially inserted into cavity 20 in the direction of arrow 27 with cavity 20 enlarging to conform to the oversized spoke 2. FIG. 6c shows the spoke 2 fully inserted into cavity 20. While this arrangement may be less effective for resistance to spoke 2 pull out due to its lack of mechanical interlock, the frictional engagement due to elastic deformation of the hub flange 16 material may provide adequate resistance to spoke 2 pull-out in some arrangements, especially with compression-spoke wheels. Longitudinal deformation is still achieved since the cavity 20 sidewalls grip the spoke along the length of the engaged portion 18.

Figure 7A:
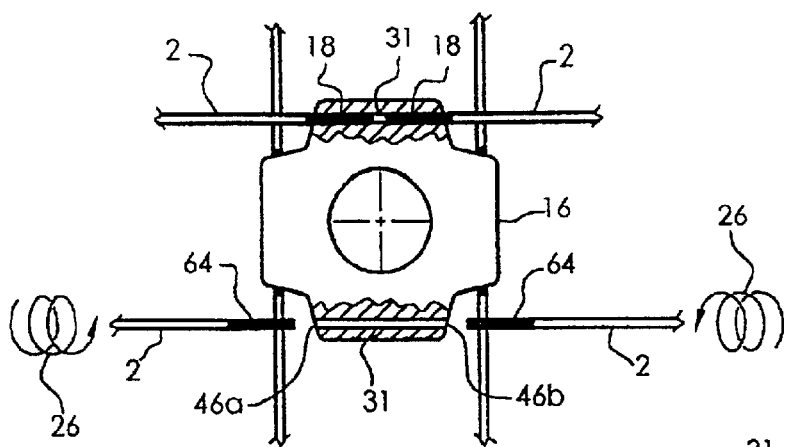
FIG. 7a is an axial plan view of the hub region of an embodiment of the present invention in schematic illustration, with the hub flange shown in partial cross-section to reveal a through-cavity of the hub flange that engages two spokes.

FIGS. 7a–d describe a variety of hub flange 16 arrangements that include a through-cavity 31 with two open ends 46a and 46b as opposed to the previous embodiments that employ blind cavities. FIG. 7a shows a through-cavity 31 where two spokes 2 share a common cavity 31. As shown here, one spoke 2 is assembled to hub flange 16 through open end 46a of cavity 31 while a second spoke 2 is assembled through the opposite open end 46b. The cavity 31 shown here is straight, which is easiest to produce, however it is envisioned that cavities may alternatively be formed in a curve or from straight segments in a "V" configuration that meet in the middle.

Figure 7B:
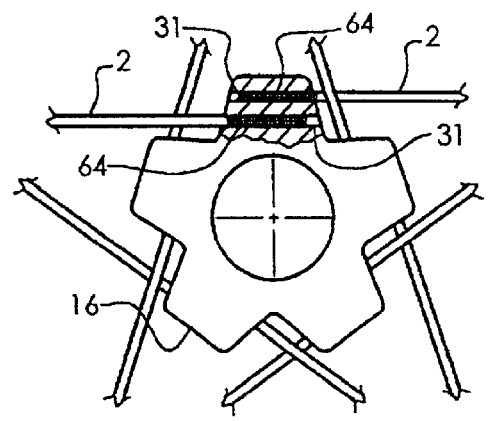
FIG. 7b is an axial plan view of the hub region of an embodiment of the present invention in schematic illustration, with the hub flange shown in partial cross-section to reveal a hub flange with parallel through-cavities.

FIG. 7b shows a hub flange 16 with two parallel through-cavities 31, with one through-cavity 31 radially outboard from the other. This type of through-cavity 31 arrangement is quite easy to produce by drilling or molding. Each cavity 31 includes a spoke 2 engaged therein. It is also envisioned that two cavities may be axially spaced from each other, creating an axially staggered through-cavity 31 configuration that is particularly useful in providing the requisite clearance between spoke spans when the span of spokes 2 will cross past each other outside of the hub flange 16.

Figure 7C:
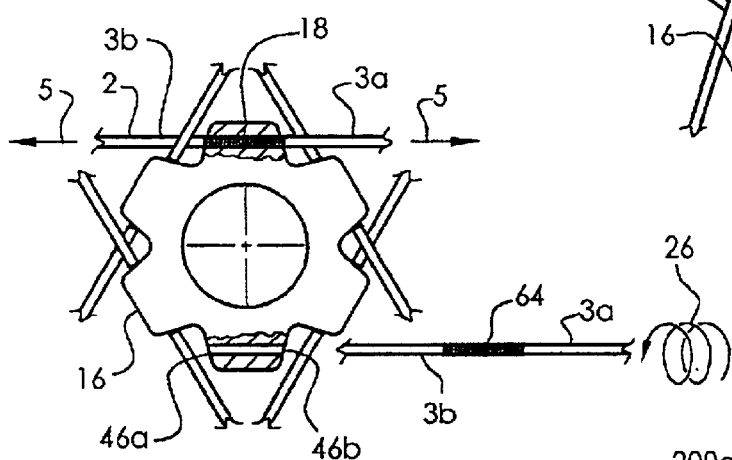
FIG. 7c is an axial plan view of the hub region of an embodiment of the present invention in schematic illustration, with the hub flange shown in partial cross-section to reveal a hub flange with a through-cavity to engage a duplex spoke.

FIG. 7c shows an embodiment that includes what may be referred to as a "duplex spoke" where the spoke 2 includes two structural portions 3a and 3b with each span extending between the hub flange 16 and the rim 8. These two structural portions 3a and 3b may be either contiguous or connected to each other in the region of the hub flange 16. As shown here, spoke 2 includes a raised helical knurl that constitutes a threaded portion 64 located at the midpoint of spoke 2. Such a raised threaded portion 64 is easily produced in a thread-rolling process well known in industry. Spoke 2 is inserted through open end 46b of through-cavity 31 to the point where structural portion 3b extends through open end 46a and the lead end of threaded portion is positioned against open end 46b. Twisting the spoke 2 further will engage the threaded portion 64 with the cavity 31 in a manner similar to that described in FIGS. 4a–c. Thus the duplex spoke 2 is now firmly engaged within the cavity 31 of hub flange 16, with structural portions 3a and 3b extending in opposite directions therefrom for connection at their outer ends 6 to the rim (not shown). A duplex spoke arrangement such as this has many advantages. One continuous spoke 2 is easier and less expensive to produce than two individual spokes. Also, in a tension spoke arrangement, with the spoke tension forces 5 pulling in opposite directions as shown, the spoke tension forces 5 are transferred directly from one structural portion 3a to the other structural portion 3b, with very little of this spoke tension force 5 transmitted through the hub flange 16. With less stress due to spoke tension forces 5, the hub flange 16 may be produced with less material, saving cost and weight.

Figure 7D:
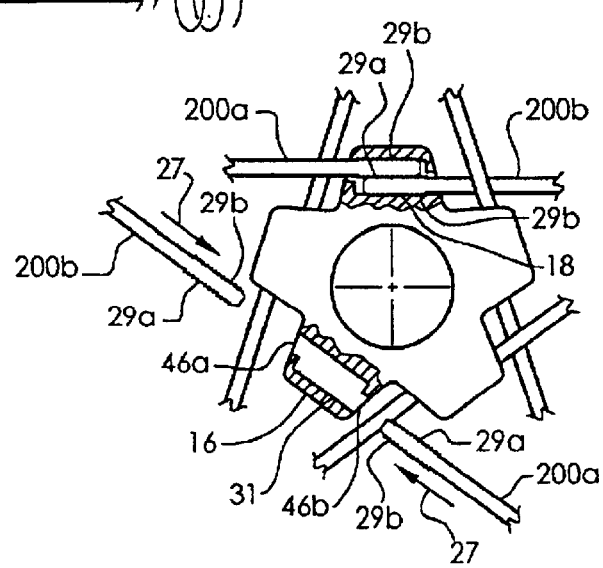
FIG. 7d is an axial plan view of the hub region of an embodiment of the present invention in schematic illustration, with the hub flange shown in partial cross-section to reveal a hub flange with a through-cavity to engage two spokes, including direct engagement between the two spokes.

FIG. 7d describes an arrangement where two spokes 200a and 200b are inserted within a through-cavity 31 such that the two spokes overlap and contact each other. Spokes 200a and 200b are of generally flat construction with a rectangular cross section and includes raked edges 29a and 29b along two opposite edges as shown. Spoke 200a is first inserted into open end 46b of cavity 31 and positioned therein. When spoke 200b is inserted into open end 46a, raked edges 29a of spoke 200a engage with raked edges 29a of spoke 200b and raked edges 29b, of both spokes engage and deform the mating sidewalls of cavity 31 as shown. The raked edges 29b act as barbs to grip the sidewalls of cavity 31 more tightly when one attempts to extract the spoke in the opposite direction of insertion. Thus, spokes 200a and 200b each engage their corresponding portions of through-cavity 31 and also engage each other. By interlocking the two spokes 200a and 200b, spoke tension forces are transferred directly between the two spokes, resulting in reduced stress at the interface with the hub flange 16.

The category of flat spokes such as shown in FIG. 7d includes spokes that have a cross sectional width greater than their thickness. It should be noted that, in the case where flat spokes are utilized, it is desirable to orient the spoke cross-section so that the width extends in the tangential direction for increased aerodynamic efficiency in the direction of rotation of the wheel.

As opposed to the previous figures, FIG. 8a shows cavities 20 to be non-aligned with the span of spoke 2 between the hub flange 16 and the rim 8. As shown, the spoke 2 must now include a bent region 12 external to engaged portion 18 in order to redirect the spoke span toward its attachment point at the rim (not shown). While this is a less desirable arrangement, since the bend introduces a flex point and a region of higher stress to the spoke, the axial orientation of the cavities 20 makes them easier to form in a mold. The hub flange 16 of this figure may be molded in a simple straight-pull mold configuration since all of the cavities 20 are shown here to be parallel. In the case where the hub flange is fabricated instead of molded, the cavities 20 may now be drilled in a single fixed set-up using standard machine tools. Also shown is axle 9 and bearing 11. The hub flange 16 also includes a reinforcement element or guiding geometry 81 to contact and support the bent region 12 of spoke 2 to reduce any flex due to spoke tension forces 5. This figure also shows a reinforcement ring 84 that is located to surround the outer circumference of the hub flange 16 and support the hub flange 16 in resisting the radial stress imparted by the spoke tension forces 5. The reinforcement ring 84 may also be positioned to contact and support the spoke 2. As shown here, it is intended that the reinforcement ring 84 also serve as a flange spacer to join two opposed hub flanges in a manner similar to hub flange spacer 190 of FIG. 15a. It should also be noted that, rather than circumscribing the outside surface of the hub flange as shown here, the reinforcement ring 84 may alternatively be concealed to reside within the material of the hub flange 16. It should be noted that such a reinforcement element, either external or concealed, may be incorporated into many of the embodiments of the present invention.

FIG. 8b describes an embodiment that shares most of the same components of FIG. 8a, however this embodiment includes an annular guiding ring 79 that surrounds the spokes 2 as shown and is engaged to the hub flange 16. The guiding ring 79 is preferably formed of a harder and stiffer material than the material of the hub flange 16 and serves to bear directly against the spokes 2 at a location on the inside of bent region 12 as shown, thereby serving to keep the spokes in place and minimize any distortion or deflection due to radial spoke tension forces 5. Thus, the guiding ring 79 may be viewed as a support structure for the spoke 2, with the hub flange 16 functioning primarily as a spoke anchoring member.

FIG. 8c describes an embodiment where two spokes 200a and 200b engage a common cavity 20. Two spokes 200a and 200b include edge knurls 29 to engage with a single cavity 20 of hub flange 16. Spokes 200a and 200b also include through hole 42 to correspond with cross-pin hole 43 of hub flange 16. Thus, when spokes 200a and 200b are forcibly inserted into cavity 20, edge knurls 29 provide a deformed engagement with the sides of cavity 20. The sidewalls of cavity 20 serve to grip and engage the spoke 2 across two opposed surfaces of the spoke as shown. Upon insertion, through openings 42 align with cross-pin holes 43. Cross-pin 45 is then passed through cross-pin hole 43 to engage with through openings 42, serving to further augment the connection between spokes 200a and 200b and hub flange 16. Thus, cross-pin 45 provides a second mechanical engagement to anchor the spokes.

FIGS. 9a–b describe an embodiment wherein an intermediate hub flange 74 is employed to reinforce and locate a spoke joining member 83. FIG. 9a is an exploded view prior to assembly and shows spokes 2 aligned to be engaged within cavity 31 of joining member 83 that contains a multiplicity of radial through-cavities 31 with spokes 2 to be engaged and located therein in a manner previously described. Hub shell 14 includes an intermediate hub flange 74 with slots 38 and snapring groove 41. The joining member 83 is inserted into the intermediate hub flange 74 as shown in FIG. 9b, with slots 38 providing clearance for spokes 2 to extend therethrough. Snapring 40 is inserted into snapring groove 41 to retain the joining member 83 within the intermediate hub flange 74. The intermediate hub flange 74 serves to surround and reinforce the joining member 83 to resist the radial loads by the spoke tension forces 5 (not shown). Also shown is bearing bore 7 of joining member 83 for mounting of bearing and axle, as previously described. It should be noted that there are a wide variety of alternate arrangements whereby a variant of the intermediate hub flange is connected to the joining member 83. Note that slots 38 provide clearance for the intermediate hub flange 74 to extend over the joining member 83 to provide locating and reinforcement thereto. Alternate designs may eliminate the extended portion of the intermediate hub flange 74 and slots 38 or else substitute clearance holes for slots 38.

The joining member 83 need not be a continuous annular element that surrounds the axle 9 as described in FIGS. 9a–b. As shown in FIG. 9c, spokes 2 may be engaged with a joining member 89, which serves as an attachment element for connecting two spokes 2 to each other and then to an intermediate hub flange 74. Two spokes 2 include threaded portions 64 that are assembled to cavities 85 of joining member 89 in a deformed engagement in the manner previously described. The joining member 89 is assembled to the intermediate hub flange 74 with the external surface of the joining member 89 positioned to engage with the pocket 87 in the intermediate hub flange 74. Pocket 87 includes extensions 88 to provide overlie retaining to engage spokes 2 such that, upon final assembly, the joining member 89 will not be able to inadvertently slip out of the pocket 87. Thus, the joining member 89 serves to join at least two spokes 2 to each other and to provide engagement geometry for connection with the intermediate hub flange 74.

Figure 10A:
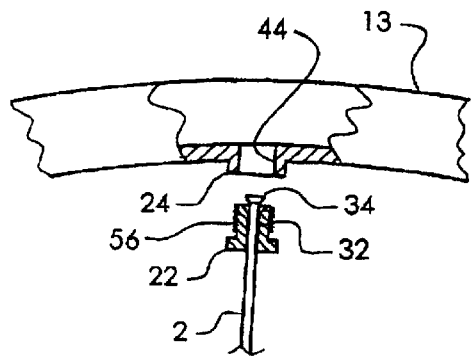
FIG. 10a is a partial view of detail 15 of FIG. 3, showing the spoke and spoke collar prior to their connection with the rim.
Figure 10B:
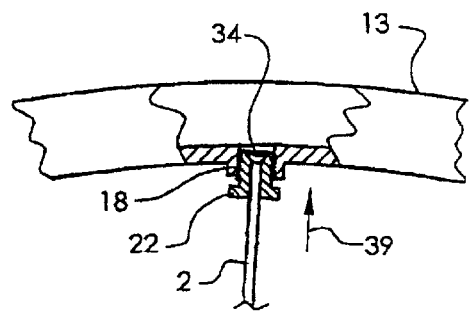
FIG. 10b is a partial view of detail 15 of FIG. 3, showing the spoke and spoke collar connected to the rim.

While most of the embodiments described thus far have focused on the engaged connection between the spoke 2 and the hub flange 16, all of these connection arrangements may be applied to the connection between the spoke 2 and the rim 13 as well. An example of such a rim connection embodiment is described in FIGS. 10a–b, which details the embodiment of FIG. 3. This arrangement employs a spoke collar 22, which acts as an intermediate connecting member between the spoke 2 and the rim 13. FIG. 10a shows the pre-assembled parts, with the spoke 2, including spoke head 34, that is passed through the threaded collar 22. Rim 13 includes a collar extension 24 and a through bore 44 that is undersized in diameter as compared with the major diameter of the threaded portion 56 of threaded collar 22. To assemble the spoke 2 to the rim 13, the threaded collar 22 is threaded into bore 44 in a self-tapping or thread-forming operation similar to that described in FIGS. 4a–c. Threaded collar 22 includes a central bore 32 through which the spoke 2 extends. As the threaded collar 22 is threaded into bore 44, as shown in FIG. 10b, the head 34 of spoke 2 bears against the edge of the central bore 32 and the spoke 2 is drawn in the direction of arrow 39. Further tightening of threaded collar 22 will serve to pre-tension spoke 2, thus creating the tension spoke wheel assembly. The rim 13 may be formed of reinforced polymer or of lightweight metal such as aluminum, with the threaded collar fabricated from a harder material such as aluminum or stainless steel to facilitate the thread-forming deformation of the sidewalls of bore 44.

Figure 11:
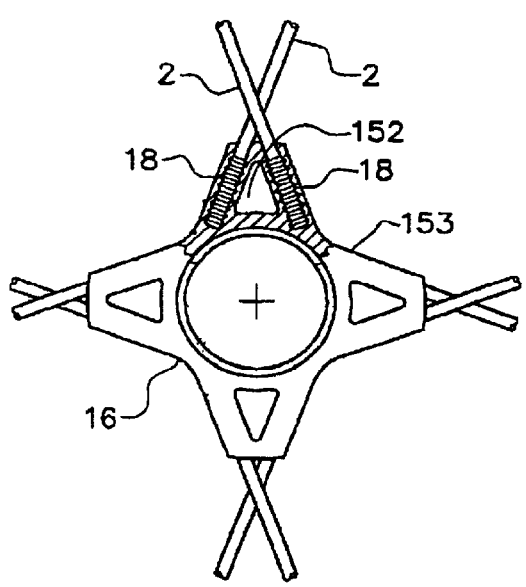
FIG. 11 is an axial plan view of the hub region of an embodiment of the present invention in schematic illustration, with the hub flange shown in partial cross-section to reveal connected spokes, including an opening in the hub flange between the spokes.

FIG. 11 describes an embodiment wherein the hub flange 16 includes at least one open region 152. As shown, there is an open region 152 or through opening between the engaged portions 18 of two spokes 2. This allows hub flange 16 material to be reduced, thereby keeping weight to a minimum and providing a perforated lightweight appearance to the hub flange 16. This also permits the hub flange 16 material to extend along a greater length of spoke 2 for increased surface area of engagement. While a through opening 152 is shown here, it is also envisioned that a closed relief or depression in this region would also serve a similar purpose. It should also be noted that, in this figure, rather than the circular profile of conventional hub flanges, the outer perimeter 153 of the hub flange shown here is contoured to follow the spokes 2 and is built up around the spokes 2 to provide greater strength to the connection and length of engagement. Conversely, the hub flange 16 perimeter is relieved in the region between the connection points to save material and weight. Similarly, the localized reinforcement to the connection between the flange and the spoke may also be achieved by increasing the thickness of the hub flange 16 in the region surrounding the spoke 2. Since the hub flange 16 may now be molded, rather than machined, it is possible to provide a wide variety of irregular contour designs to the hub flange 16 to optimize material use and to enhance aesthetics. While these variations in hub flange 16 geometry save the cost and weight of the hub flange 16 material, it also allows for a more consistent thickness of hub flange 16 material surrounding the cavities to aid in molding and to provide uniform shrinkage of the hub flange 16.

Figure 12:
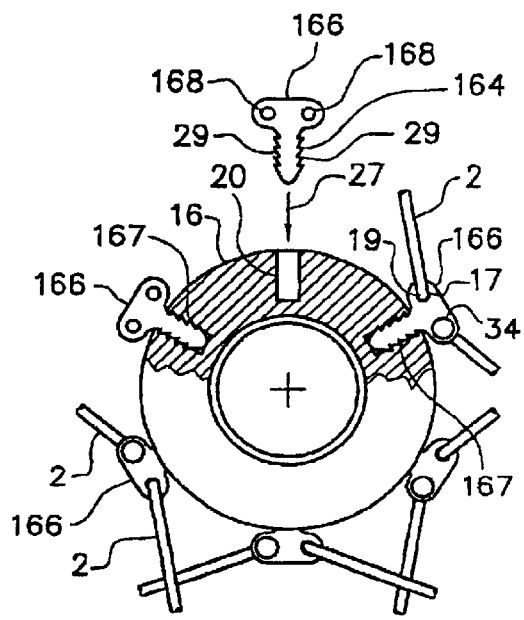
FIG. 12 is an axial plan view of the hub region of an embodiment of the present invention in schematic illustration, with the hub flange shown in partial cross-section, including an intermediate connecting member in various stages of assembly with the hub flange.

FIG. 12 describes an embodiment where an intermediate connecting member 166 is employed to join the spokes 2 to the hub flange 16. Thus, the intermediate connecting member 166 serves a similar function as the threaded collar 22 of FIGS. 10a and 10b. The intermediate connecting member 166 includes a stem 164 that includes edge knurls 29. Stem 164 is first inserted into cavity 20 in the direction of arrow 27, resulting in a deformed engagement region 167 in a manner previously described. Each intermediate connecting member 166 includes two holes 168, each for attachment of a mating spoke 2. In this figure, the spokes 2 are shown to be of the conventional "J"-bend configuration as described in FIGS. 2a–c and are assembled through holes 168 of the intermediate connecting member 166 in the conventional manner. Since the intermediate connecting member 166 is of harder material than the hub flange 16, it may be able to support such a spoke connection. As is shown here, a multiplicity of spokes 2 may be assembled to a single intermediate connecting member 166.

Figure 13A:
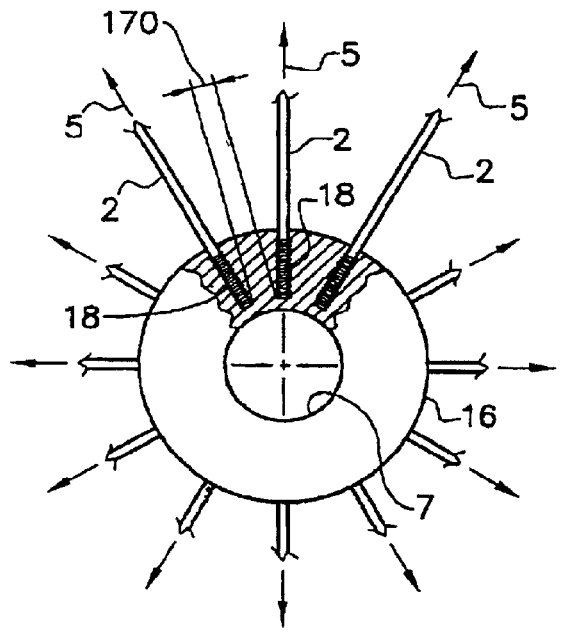
FIG. 13a is an axial plan view of the hub region of an embodiment of the present invention in schematic illustration, with the hub flange shown in partial cross-section to reveal a gap between adjacent spokes connected thereto.

FIG. 13a shows a radial spoke lacing pattern where the spokes 2 extend radially outward from the hub flange 16 to the rim (not shown). This type of spoke lacing, as opposed to oblique spoke lacing, results in exceptionally large radial stress and expansion of the hub flange 16 due to spoke tensile loads 5. In this case, there is no spoke crossover in the engaged portion 18 and, as compared to FIGS. 14a–b, there is a relatively large gap 170 of hub flange 16 material between adjacent spokes 2. Particularly with polymer hub flange 16 material, this gap 170 between spokes 2 can lead to increased material creep and elastic deflection. Even if the stresses in the hub flange 16 material are low enough not to permanently deform the hub flange 16, the spoke loads may cause the hub flange 16 to increase in size and the bearing bore 7 to increase in diameter. These are undesirable characteristics and require that a hub flange 16 of this type be made from a higher stiffness material and/or employ a greater flange cross-section dimension. The result is increased weight and cost as compared to the embodiment of FIGS. 14a–b.

Figure 13B:
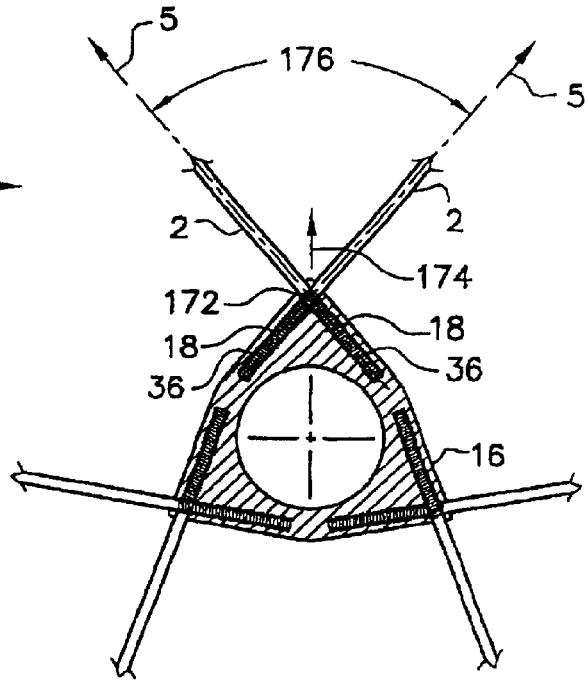
FIG. 13b is an axial plan view of the hub region of an embodiment of the present invention in schematic illustration, with the hub flange shown in partial cross-section to reveal a crossed orientation between spokes connected thereto.

FIG. 13b shows the crossover region 172 of two of the spokes 2 of the hub flange 16. These two spokes 2 extend in their engaged portions 18 to cross very close to each other with a relatively small gap of hub flange 16 material therebetween as compared to gap 170 of FIG. 13a. The amount of hub flange 16 material between adjacent spokes 2 is reduced to the minimal axial gap at the crossover 172. While this is an improvement over the embodiment of FIG. 13a, this arrangement, with an acute angle 176 between the two crossing spokes 2 (as measured outward from the axle), still results in a radially outward resultant force 174 imparted to the hub flange 16 due to spoke tension forces 5. This radial resultant force 174 imparts hoop and radial stress in the hub flange 16 material. As the angle 176 between the two spokes 2 is increased, the resulting radial resultant force 174 is reduced, as is the associated hoop stress in the hub flange 16. It should be noted that the engaged portion 18 of the spokes 2 grip the hub flange 16 material along the length of the knurled portion 36 of the spoke 2.

Figure 13C:
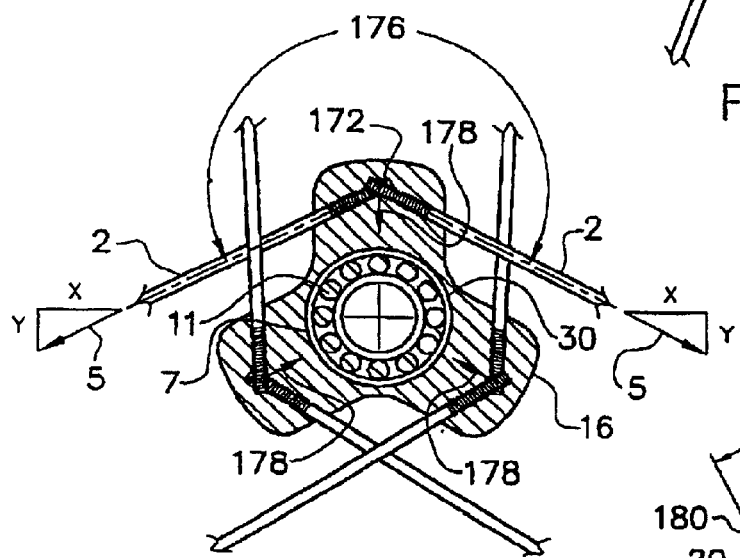
FIG. 13c is an axial plan view of the hub region of an embodiment of the present invention in schematic illustration, with the hub flange shown in partial cross-section to reveal a crossed orientation between spokes connected thereto, with an angle greater than 180 degrees between the crossed spokes.

As angle 176 approaches 180 degrees, the spoke tensile forces 5 pull in directly opposed directions and therefore the radial resultant force 174 approaches zero. FIG. 13c shows the angle 176 increased to greater than 180 degrees (as measured outward from the axle), which now serves to impart a small radially inward resultant force 178. As shown in FIG. 13c, three such spoke pairs each provide a radially inward force 178 due to spoke tensile forces 5. The result is three equally spaced radial resultant forces 178, which together apply a radially inward compressive load on the hub flange 16. While most polymer hub flange materials will likely resist this load, it should be noted that a bearing 11 with a hard steel outer race 30 is located in the center of the hub flange 16, inward from the spokes 2. In addition to bearing function duties, the steel outer race 30 also provides support to the hub flange 16 to resist the radial loads 178 induced by the spokes 2 and to prevent the hub flange 16 from deforming. It can be seen that these radial forces 178 induce the bearing bore 7 of the hub flange 16 to shrink and grip the outer bearing race 30, creating a firm fitment between the two parts.

Figure 13D:
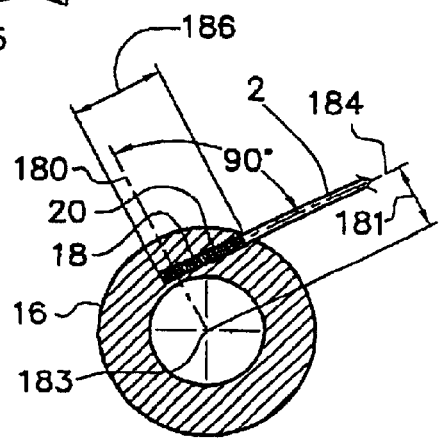
FIG. 13d is an axial plan view of the hub region of an embodiment of the present invention in schematic illustration, with the hub flange shown in cross-section to reveal an oblique spoke connected to the hub flange to a depth beyond an imaginary radial line.

While FIG. 13a shows a radially extending engaged portion 18, in order for the length of engagement 186 to be sufficient to achieve a firm connection, the hub flange 16 must have a relatively large radial width. While this is often easy to achieve, it is usually preferable to employ an oblique or tangential spoke lacing arrangement, as is shown in FIGS. 13b–c, where the engaged portion 18 of the spoke 2 extends within the hub flange 16 in a generally tangential orientation that is offset from the axial centerline of the wheel, thereby allowing for a more compact hub flange 16. To achieve this, it is preferable that the spoke extends, in its engagement within the hub flange, to a point beyond an imaginary radial line 180 extending from the center of the hub flange 16 in a direction perpendicular to the spoke as shown in FIG. 13d. This depth of engagement in oblique lacing provides a firm connection between the spoke 2 and hub flange 16 and also results in close proximity or overlap with other spokes (not shown) anchored within the same hub flange 16. Thus, in the embodiments described herein, it is advantageous to have a longitudinal depth of engagement at least to this imaginary radial line 180 as shown. Dimension 181 shows that, in oblique spoke lacing, the longitudinal axis 184 of the spoke 2 span is offset from the central axis 183 of the axle. Note also that the cavity 20 includes a longitudinal axis that is collinear with the longitudinal axis 184 of the spoke 2 span.

It should be noted that many of the embodiments described herein are particularly directed to arrangements wherein the hub flange material is generally weaker and less stiff than the mating spoke material. To create a solid connection and reduce the contact stress between the spoke and the hub flange in such cases, there must be a reasonable length of engagement interface between the flange (and/or rim) and the spoke. While a wide variety of metallic casting materials are envisioned in application to the present invention, this invention is especially pointed to polymeric molding materials that are generally lighter and more economical to produce and to mold. Since the hub flange material is likely weaker and more flexible than the spoke material, it is desirable to configure their connection arrangement such that the spoke(s) be employed to reinforce or otherwise reduce the stresses within the flange material.

By locating the spokes 2 within the hub flange 16 such that they overlap or otherwise maintain close proximity to other spokes, the span of weaker hub flange material between the engaged portions 18 of these spokes is reduced. This serves to stiffen the connection between these spokes, since the short span of flexible hub flange 16 material has less overall stretch than a longer span. In addition, as the spokes are brought closer to each other, the interconnecting hub flange 16 material experiences a higher level of shear stress and a lower level of tensile stress. This also contributes to the strength of the connection between the spokes. Thus, with a reduced span of hub flange material between spokes 2 connected thereto, spoke tensile forces 5 are transmitted more directly from one spoke 2 to its neighbor. This tends to reduce the stresses in the hub flange 16 material outside the region of the reduced span. The geometry of the hub flange 16 may now be optimized to provide higher strength and stiffness in the region surrounding this overlap.

Figure 14A:
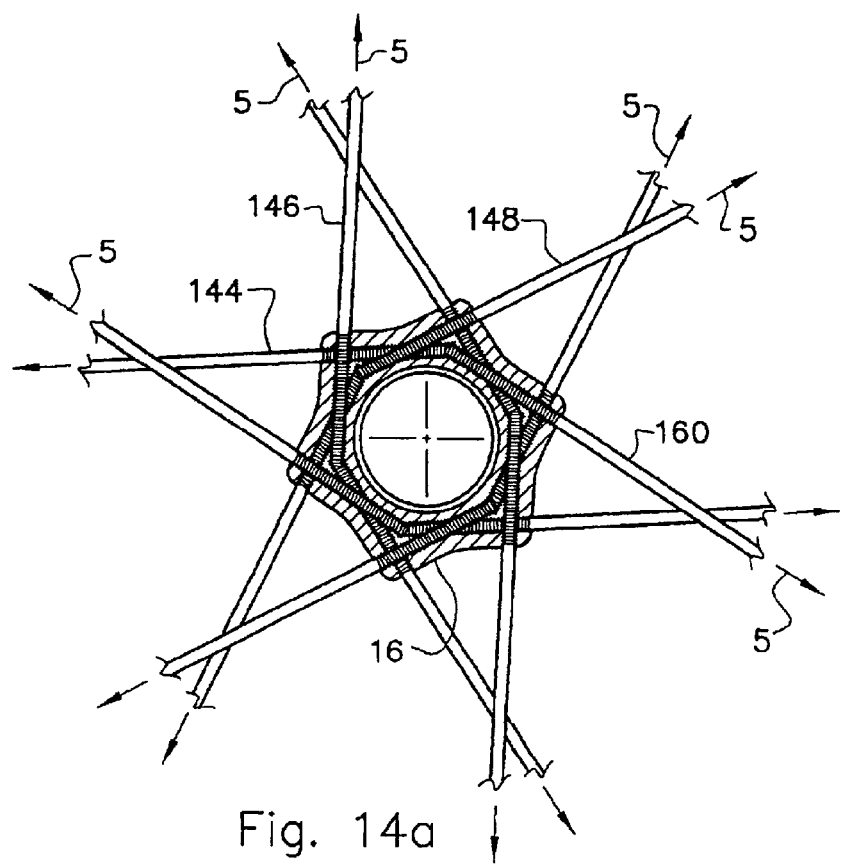
FIG. 14a is a cross-section of the hub flange in axial plan view, illustrating an alternate embodiment of the present invention, including overlapping spokes within the hub flange.
Figure 14B:
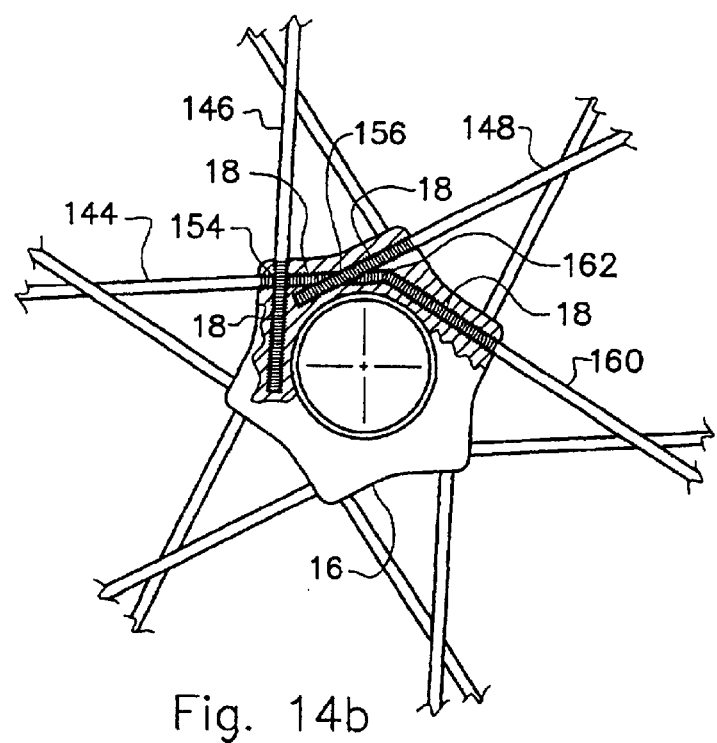
FIG. 14b is a partial cross-section of the hub flange in axial plan view, illustrating the embodiment of FIG. 14a and detailing the overlapping connection of four of the spokes within the hub flange.

With a longitudinal engagement region, as described previously, the spoke may serve to support and reinforce the hub flange material along the length of this engagement region. Further, if a given spoke crosses two or more spokes within the hub flange 16 material, the spoke then serves as a strengthening bridge to reinforce the hub flange 16 material between these two other crossing spokes. This is well illustrated in FIG. 14b, where one spoke 144 has knurling to grip the hub flange 16 material along the length of its engaged portion 18 and is shown to be arranged to cross over three other spokes 146, 148 and 160 within the hub flange 16 material. FIG. 14b is actually a detail, showing only the spokes 144, 146, 148 and 160 of FIG. 14a to more clearly illustrate the crossover locations associated with this one individual selected spoke 144. Thus, it may be seen that spoke 144 crosses spoke 146 at crossover region 154 and also crosses spoke 148 at crossover region 156 and also crosses spoke 160 at crossover region 162. In FIG. 14a, a series of twelve spokes are shown to each extend to overlap with three neighboring spokes to create a full circumference of bridged spokes within the hub flange 16. In this way, the engaged portion 18 of the spoke 2 functions to reinforce the hub flange 16 very much like rebar serves to reinforce cast concrete. Thus, the engaged portions of these spokes provide radial and hoop strength reinforcement to the hub flange 16 as well as transmitting spoke tensile loads 5 more directly to adjoining spokes, thereby transferring less of the related stress to the weaker hub flange 16 material.

It should be noted that, as described in FIG. 14b, that clockwise radiating oblique spokes 146, 148 and 160 are axially offset from counterclockwise radiating oblique spoke 144. This is necessary to permit crossover regions 154, 156 and 162. Thus it may be seen in FIG. 14a that, for hub flange 16, all of the clockwise radiating oblique spokes, as well as their associated cavities, are axially offset from all of the counterclockwise radiating oblique spokes. This permits the crossover regions previously mentioned and also provides an axially staggered spoke alignment such that the exposed spoke spans of these oblique spokes may cross past each other without interference as shown. It should also be noted that two crossover spokes may be located to contact each other at their crossover location. This minimizes the stagger offset between spokes.

As mentioned previously, for a tension spoke wheel, at least two axially spaced hub flanges 16 are required. If the cavities of the hub flanges 16 were to be formed in a mold with core pins, it would therefore require two series of movable core pins to be able to mold a complete hub with both hub flanges 16. Such a mold arrangement is possible, but is far more complex and expensive than molding only a single hub flange at a time. Therefore, it is advantageous to mold each hub flange 16 separately and subsequently join the two hub flanges 16 to each other after molding to create a complete hub shell 14. Another advantage of such a joined hub flange 16 assembly system is that hub flange portions of different configurations may now be combined to create a wide range of complete hub shell 14 units. In other words, a front hub shell may be created from two front hub flanges, a rear hub shell may be created from one front hub flange and one rear hub flange, a disc brake hub flange may be substituted to create a disc brake compatible hub shell, etc. Thus, a family of six hub flange combinations may be created from a menu of only three individual hub flange components. The result is a high degree of adaptability with a minimum amount of mold tooling and part inventory.

Figure 15A:
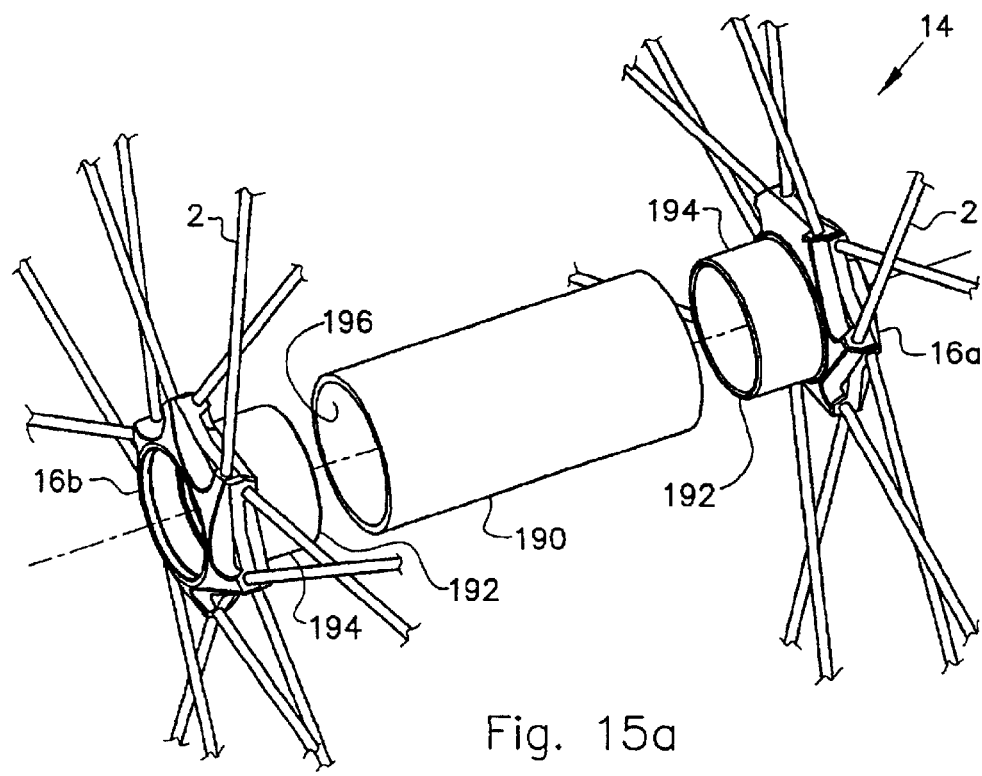
FIG. 15a is an exploded perspective view of the hub shell assembly of an alternative embodiment of the present invention, including a flange spacer between two axially space hub flanges.

If we view the complete hub shell 14 as including two axially spaced hub flanges with a spacer element to axially separate the hub flange, the hub flanges and spacer(s) constitute the rotatable hub shell 14. FIG. 15a describes an embodiment that includes a separate cylindrical hub flange spacer 190 component to axially space the two outer hub flanges 16a and 16b in their desired separation dimension. In FIG. 15a, the hub flanges 16a and 16b each include a collar 192 that extends axially as shown. The outside surface 194 of the collar 192 of each hub flange is inserted into the inside surface 196 of their respective ends of the flange spacer 190. Adhesive is added to this sleeved joint in the gap between the surfaces 194 and 196 to firmly connect the components together. Other joining methods may be employed instead of, or in addition to, the adhesive, such as snap fits, press fits, fasteners, etc. Additionally, in the absence of a fastening system, the spoke tension forces may be utilized to force the hub flanges 16a and 16b axially toward each other to sandwich and retain the spacer 190. It is further envisioned that the spacer 190 may be incorporated within hub flange 16a as a single component. There would then be only one joining connection required between hub flange 16b and spacer 190.

Figure 15B:
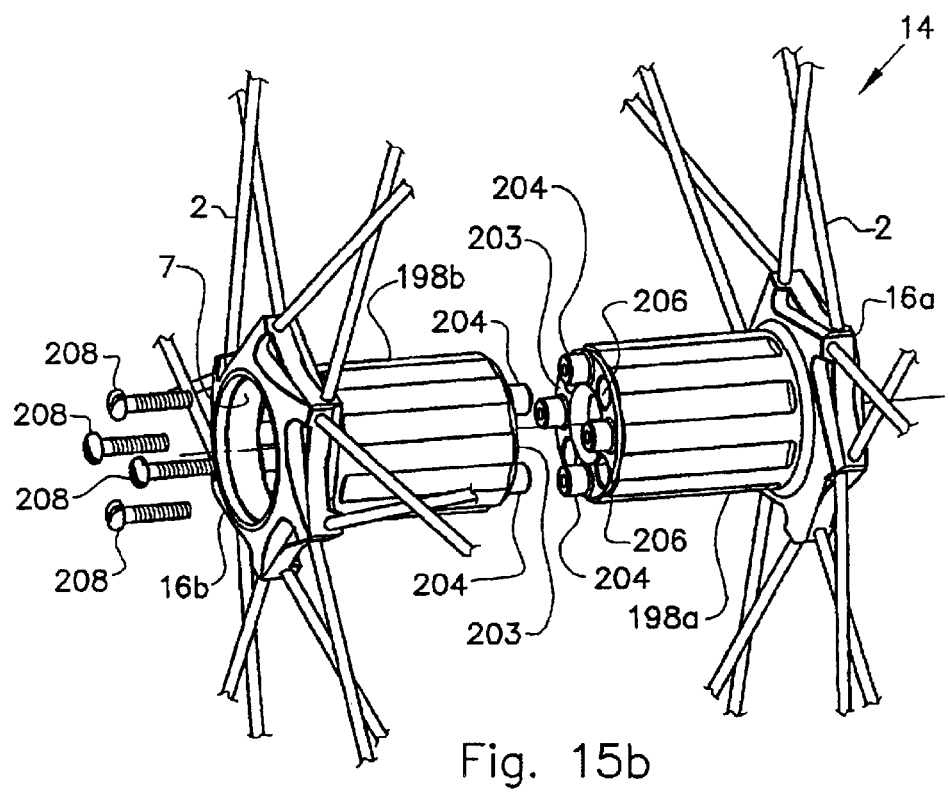
FIG. 15b is an exploded perspective view of the hub shell assembly of an alternative embodiment of the present invention, including two hub flanges, each with an integral flange spacer.

FIG. 15b describes an embodiment where the hub flanges 16a and 16b each include spokes 2, bearing bore 7 and an axially extending hub flange spacer 198a and 198b. These hub flange spacers 198a and 198b are then joined to each other to lock the flanges 16a and 16b in their proper spaced orientation. As shown in this figure, the joining face 203 of both flange spacers 198a and 198b have mating pegs 204 and sockets 206 that key the flanges 16a and 16b to prevent independent rotation and to align the spokes 2 to span directly to their connection at the rim (not shown). Screws 208 are passed through the opposite side of the sockets 206 of hub flange spacer 198b and threaded into the center of their mating pegs 204 of hub flange spacer 198a to then lock the assembly together. In fact, these two flanges 16a and 16b are shown here as identically shaped components that are assembled back-to-back. Of course, this screw fastener joining method is merely representative of a wide variety of joining methods known to industry.

In FIG. 2a, it is shown that tension may be imparted to the spokes 2 of wheel 1 by manipulating the threaded spoke nipples 21 to adjust the length of the spokes 2. As the spoke 2 length is reduced between its anchor points at the rim 8 and the hub flange 16, a pre-tension is imparted to the spokes. This method of applying spoke tension is well known in industry with the threaded spoke nipple adjustment either at the rim 8 connection as shown here or the hub flange 16 connection. For the present invention, this is the preferred method of applying spoke pretension.

As an alternative to adjusting the spoke length to achieve spoke 2 tension, a fixed length spoke 2 may be employed, where the spoke 2 is fixed at either end and pre-stretched in tension during assembly of the wheel 1. One method of applying spoke 2 tension to a wheel 1 assembly with fixed-length spokes 2 is illustrated in FIG. 16 where hub flanges 16a and 16b are separately formed. Prior to pre-tensioning, spokes 2 fixed at their outer ends 6 to the rim 13 and at their inner ends to their respective hub flanges 16a and 16b. Hub flanges 16a and 16b are axially spread apart from each other in the direction indicated by arrows 199 to apply tension to spokes 2. Hub flange spacer 202 is then inserted between the two hub flanges 16a and 16b in the direction 201 to lock hub flanges 16a and 16b in the spread position. When the spreading force is relaxed, the hub flanges bear against the hub flange spacer 202 locking the spokes 2 in a pre-tensioned state. Note that, in this example, spoke 2 has an engaged portion 18a for connection with the rim 8 and an engaged portion 18b at its opposite end for connection with the hub flanges 16a and 16b.

Another method of pre-tensioning fixed-length spokes can include pre-stretching the spokes 2 in a brace prior to assembly. At least one end of the spoke is left unconnected and free prior to assembly. During the assembly process the free end(s) of the spoke is connected and anchored to its respective outer rim or hub flange 16 while still in the pre-stretched state. After assembly, the brace is removed and the spokes 2 remain under pre-tension.

Figure 17A:
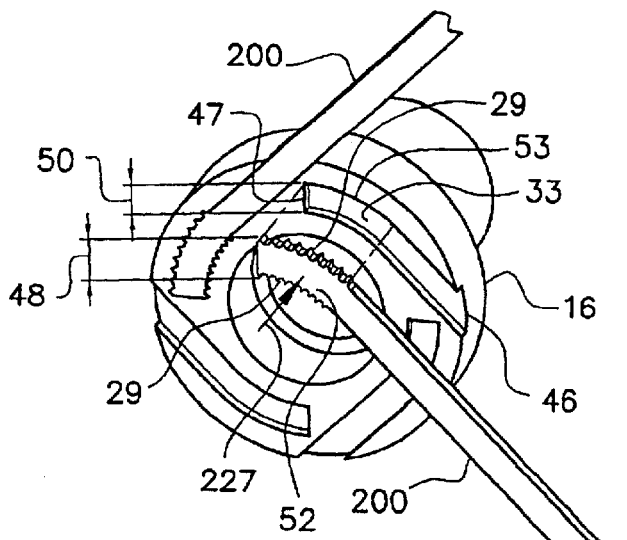
FIG. 17a is an exploded perspective view of the hub shell assembly of an alternative embodiment of the present invention, showing a spoke in various stages of assembly with the hub flange, including an axial assembly direction.
Figure 17B:
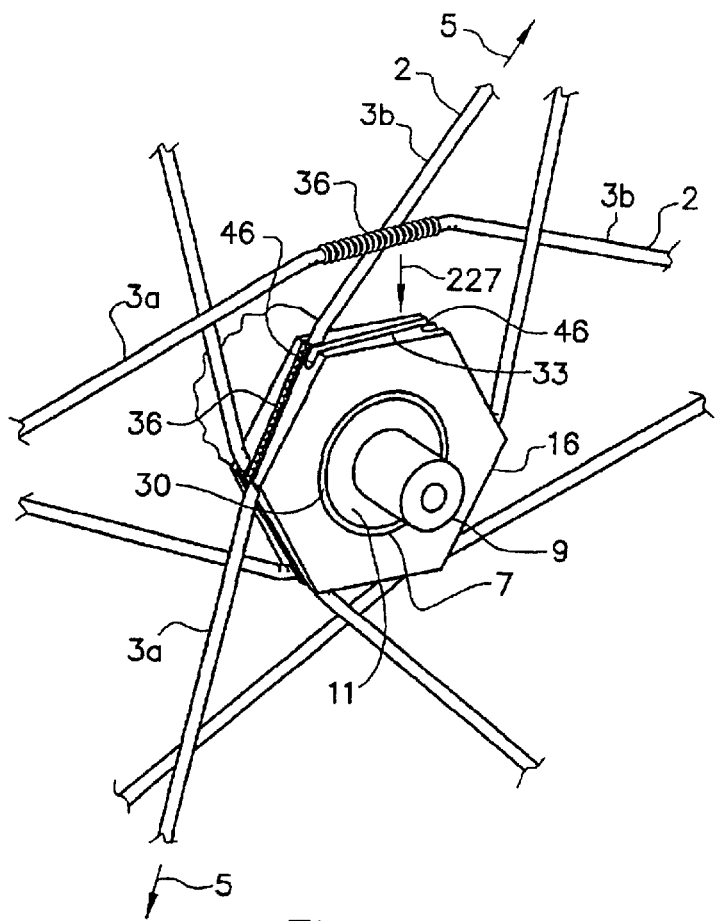
FIG. 17b is an exploded perspective view of the hub shell assembly of an alternative embodiment of the present invention, showing a spoke in various stages of assembly with the hub flange, including a radial assembly direction.
Figure 17C:
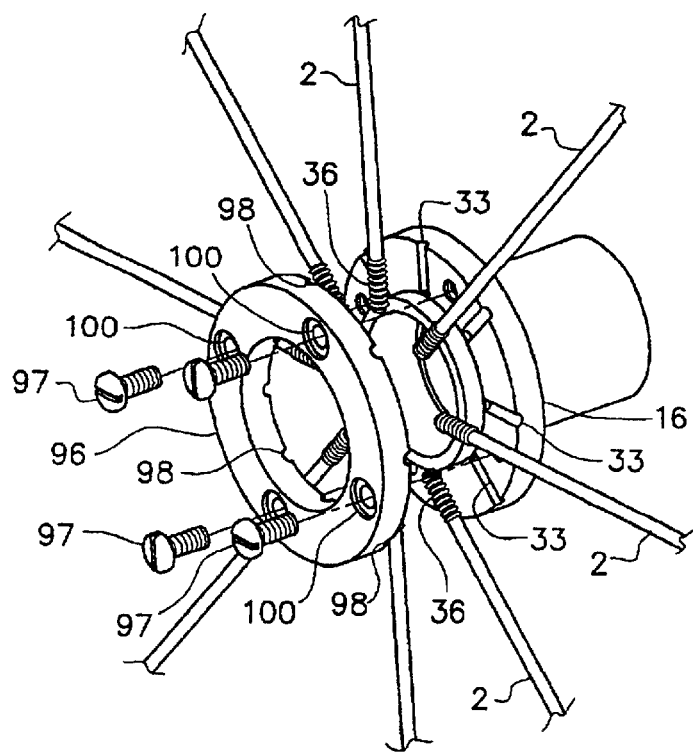
FIG. 17c is an exploded perspective view of the hub shell assembly of an alternative embodiment of the present invention, including a clamping member to sandwich the spoke.

The embodiments of FIGS. 17a–c utilize open cavities 33 in the hub flange 16 to accept the spokes. Unlike the embodiments previously described, which all have closed sides and at least one open end 46, an open cavity 33 is open along at least a portion of its side. Although the spoke 2 may still be inserted through the end of an open cavity 33 in a direction parallel to the longitudinal axis of the cavity, the open cavity arrangement also allows the spoke 2 to alternatively be inserted through the open side of the open cavity 33.

FIG. 17a shows a hub flange 16 with an open cavity 33 with one open end 46 and one closed end 47. Spoke 200 includes edge knurls 29 along two of its edges. The width 48 of spoke 200 is slightly wider than the width 50 of the cavity such that, when the spoke 200 is assembled to the cavity 33 in the direction of arrow 227, the edge knurls 29 deform the mating sides of the cavity 33. The edge knurls 29 thereby engage the sides of cavity 33 to firmly anchor the spoke 200 to the hub flange 16 to resist the generally radial spoke tension forces. Note that, in this figure, the spoke 200 is assembled to the hub flange 16 in a generally axial direction. Note also that cavity 33 is not a straight cavity, but instead includes a curved portion 52 to receive a corresponding curved portion 53 of spoke 200.

FIG. 17b shows a duplex spoke 2 with two structural portions 3a and 3b including a configured portion 36 therebetween. Hub flange 16 includes open cavity 33 with two open ends 46. Spoke 2 is inserted into cavity 33 in the generally radial direction of arrow 227, resulting in a deformed engagement due to the interference fit between the knurled portion 36 of the spoke and the mating width across the sidewalls of the cavity 33. Note that in this figure, the direction of assembly is in a generally radial direction. The spoke tensile forces 5 serve to drive the knurled portion 36 deeper into the cavity 33 in a radial direction, further augmenting its deformed engagement with the cavity 33 and including engagement along all of the sides of cavity 33. A steel bearing 11, as shown in FIG. 17b, includes an outer bearing race 30 that is inserted in bearing bore 7. This outer bearing race 30 may also serve to provide compressive radial strength reinforcement to the hub flange 16 to resist any radial deflection induced by spoke tensile loads 5.

FIG. 17c describes an embodiment that includes a clamping member 96 to sandwich and clamp the spoke 2 between the hub flange 16 and the clamping member 96. Hub flange 16 includes open cavities 33 for engagement with configured portions 36 of spokes 2. Clamping member 96 includes open cavities 98 that are aligned to be opposed to cavities 33 of the hub flange 16. In assembly, spokes 2 are first positioned such that knurled portions 36 are nested in their corresponding cavities 33. Clamping member 96 is then assembled to axially sandwich the knurled portions 36 of spokes 2, with the knurled portions nested also in their corresponding cavities 98. Screw 97 is passed through clearance hole 100 and threaded into the hub flange 16. When the screw 97 is tightened into hub flange 16, with its screw head pressed against the clamping member 96, the clamping member is driven axially toward the hub flange to sandwich the knurled portions 36 of spokes 2. The knurled portions 36 are then pressed between cavities 98 and 33, embossing and deforming cavities 98 and 33 to conform to knurled portion 36. A firm deformed engagement connection between the hub flange 16 and the spoke 2 is thus achieved.

As mentioned previously, it is desirable to form the hub flange 16 from polymer material in an injection molding process. It is also preferable to form the cavities of the hub flange 16 by forming them with mold cores during the molding process or by drilling the cavities as a post-mold machining operation. Either process will result in a cavity with smooth sidewalls. With the spoke engaging the smooth sidewalls of the hub flange cavity, some sort of deformed engagement is desirable to create the mechanical interlock engagement to achieve firm anchoring of the spoke 2 within the cavity. For a polymer hub flange, a longitudinal connection, as previously described, is a requirement. However, there are alternate cavity configurations that permit the cavity to include a configured surface that will mate with a configured surface of the spoke to create a longitudinal connection for firm anchoring between the spoke and the polymer hub flange.

Figure 18A:
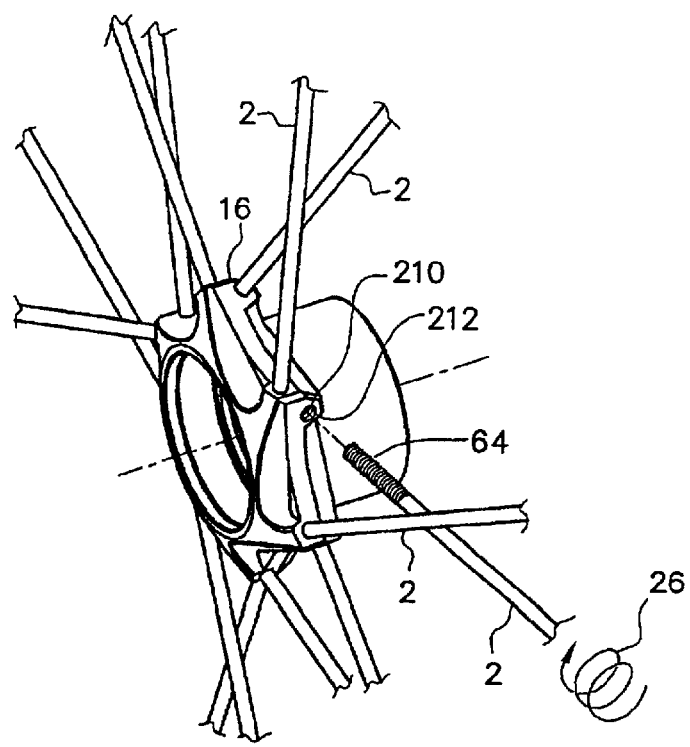
FIG. 18a is an exploded perspective view of the hub shell assembly of an alternative embodiment of the present invention, showing a spoke in various stages of assembly with the hub flange, including a matched threaded assembly between the spoke and the hub flange.

FIG. 18a shows an arrangement similar to that described in FIGS. 4a–c. However, in this figure, blind cavity 210 includes a tapped internal thread 212 to mate with threaded portion 64 of spoke 2. Although it is possible to create internal thread 212 in a molding operation by utilizing unthreading cores, this results in a complex and expensive mold. It is often more desirable to tap the internal thread 212 as a secondary operation. The spoke 2 is then joined to the hub flange 16 by threadably assembling threaded portion 64 in the direction of arrow 26 and into internal thread 212, creating a longitudinal engagement between the spoke 2 and the cavity 210 for a firm connection therebetween. By this arrangement, deformation of cavity 210 by spoke 2 is reduced or even eliminated.

Figure 18B:
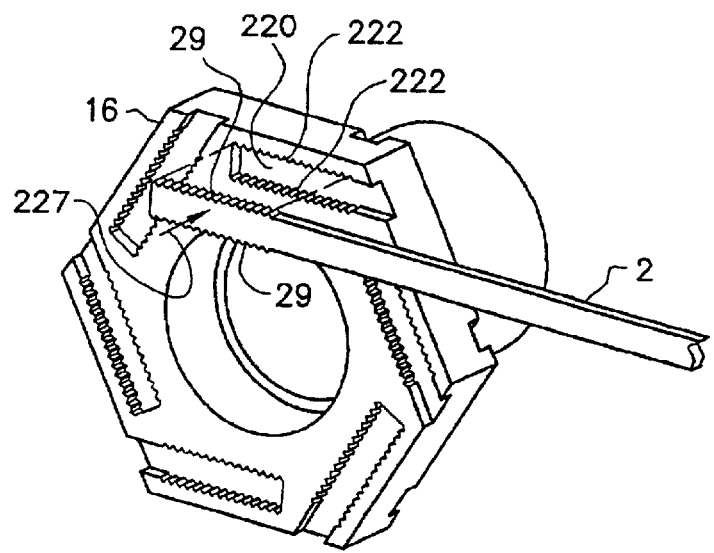
FIG. 18b is an exploded perspective view of the hub shell assembly of an alternative embodiment of the present invention, showing a spoke prior to assembly with the hub flange, including matched configured surfaces between the spoke and the open cavity of the hub flange.

FIG. 18b describes an embodiment similar to FIG. 17a. However, in this figure, a polymer hub flange 16 includes an open cavity 220 with configured surfaces 222 on its sidewalls. Spoke 2 includes configured surfaces 29 that are matched to mate with configured surfaces 222. The spoke 2 is then joined to the hub flange 16 by assembling the spoke 2 to the cavity 220 in a generally axial direction as indicated by arrow 227 such that configured surfaces 29 mate and engage with configured surfaces 222, creating a firm connection therebetween to resist spoke tension forces. In comparison with FIG. 17a, which relies on deformation of the cavity 33, the configured surface 222 of cavity 220 in FIG. 18b is more closely matched with the configured surface 29 of spoke 2 and deformation of cavity 220 is reduced or even eliminated.

Figure 19:
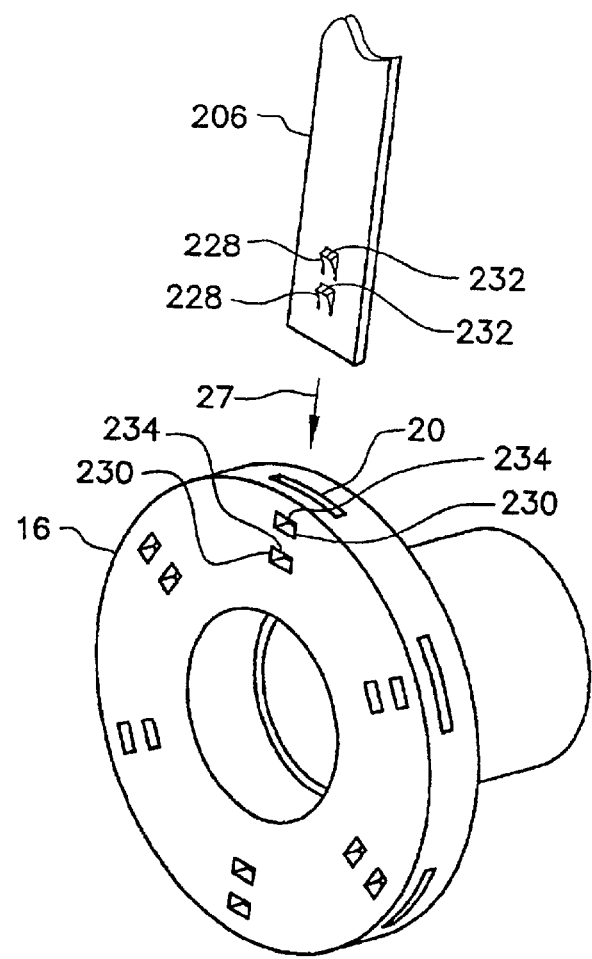
FIG. 19 is an exploded perspective view of the hub shell assembly of an alternative embodiment of the present invention, showing a spoke prior to assembly with the hub flange, including a flexible tang to engage the cavity of the hub flange.

FIG. 19 describes an embodiment whereby a portion of the spoke 206 is deformed upon insertion into cavity 20. Hub flange 16 includes blind cavity 20 with windows 230 extending axially between the outside surface of the hub flange 16 and the cavity 20 sidewall as shown. Spoke 206 includes two flexible tangs 228. As spoke 206 is inserted into cavity 20, tangs 228 passively flex to deform and retract to be flush with the surface of the spoke 206 to allow the spoke 206 to pass into cavity 20. With spoke 206 fully inserted in cavity 20, tips 232 of tangs 228 are aligned with their corresponding edges 234 of windows 230, thus permitting the tangs 228 to snap back to their extended position within their windows. The tips 232 of tangs 228 are thereby engaged with the edges 234 of windows 230 and the spoke 206 is thereby anchored to the hub flange 16 for resistance to spoke 206 pull-out. Thus it may be viewed that tangs 228 undergo temporary elastic deformation to achieve engagement.

It is also envisioned that the flexible tang may alternatively be incorporated within the cavity while the mating window is instead formed in the spoke. Upon assembly of the spoke to the cavity, the tang of the cavity would then engage the window of the spoke for resistance to spoke pull-out.

Figure 20:
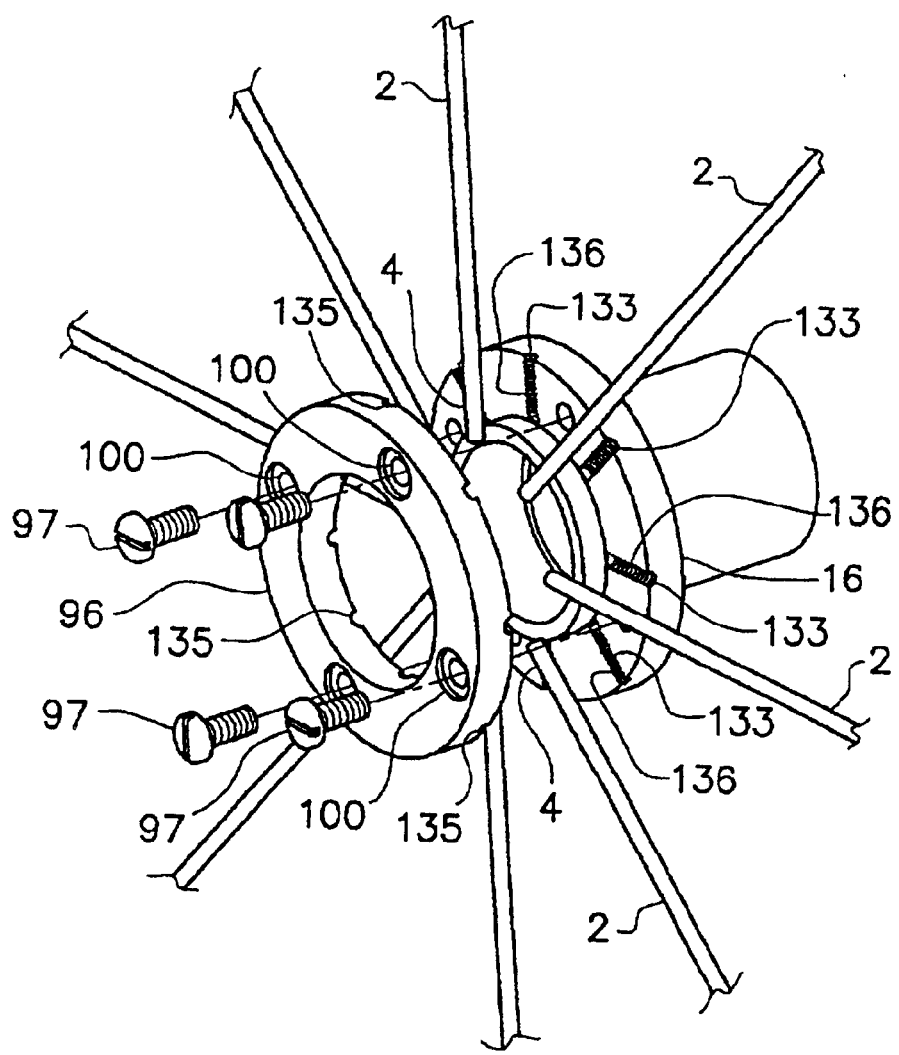
FIG. 20 is an exploded perspective view of the hub shell assembly of an alternative embodiment of the present invention, including a configured cavity to deform the spoke and a clamping member to sandwich the spoke.

FIG. 20 describes an embodiment similar to FIG. 17c, where hub flange 16 includes an open cavity 133. Clamping member 96 includes open cavities 135 and serves to sandwich and clamp the spoke 2 between the hub flange 16 and the clamping member 96. In contrast to FIG. 17a, the surface of both the cavities 133 and the cavities 135 have a configured interior surface in the form of raised ribs 136. Spoke 2 has a smooth end 4 and is generally of softer material than the material of both the hub flange 16 and the clamping member 96. One candidate spoke material for this embodiment is a composite spoke 2 formed from polymer resin with longitudinal synthetic fiber reinforcement. Clamping member 96 includes open cavities 135 that are aligned to be directly opposed to cavities 133 of the hub flange 16. In assembly, spokes 2 are first positioned such that ends 4 are nested in their corresponding cavities 133. Clamping member 96 is then assembled to axially sandwich the ends 4 of spokes 2, which are also nested also in their corresponding cavities 135. Screw 97 is passed through clearance hole 100 and threaded into the hub flange 16. When the screw 97 is tightened into hub flange 16, with its screw head pressed against the clamping member 96, the clamping member 96 is driven axially toward the hub flange 16 such that the raised ribs 136 of cavities 133 and 135 emboss and deform the ends 4 of the spokes 2 to conform to raised ribs 136. A firm deformed engagement connection between the hub flange 16 and the spoke 2 is thus achieved.

Figure 21A:
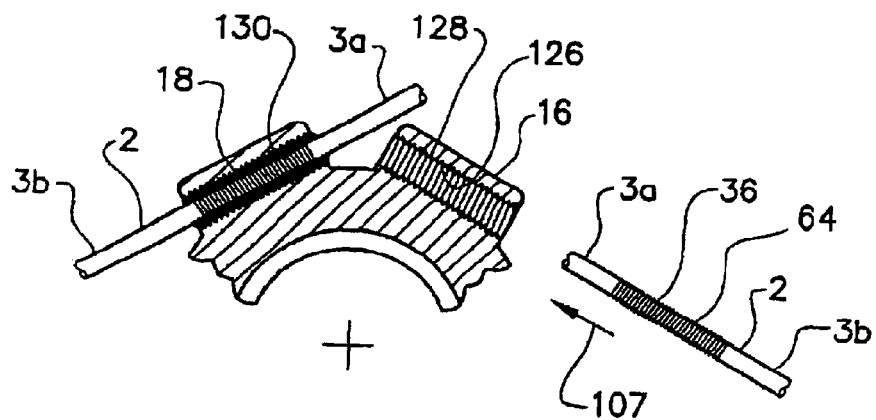
FIG. 21a is a partial cross-section view of the hub flange, shown in axial plan view and schematically illustrating an alternate embodiment of the present invention that includes a cylindrical encapsulating connection between the hub flange and the spoke(s)
Figure 21B:
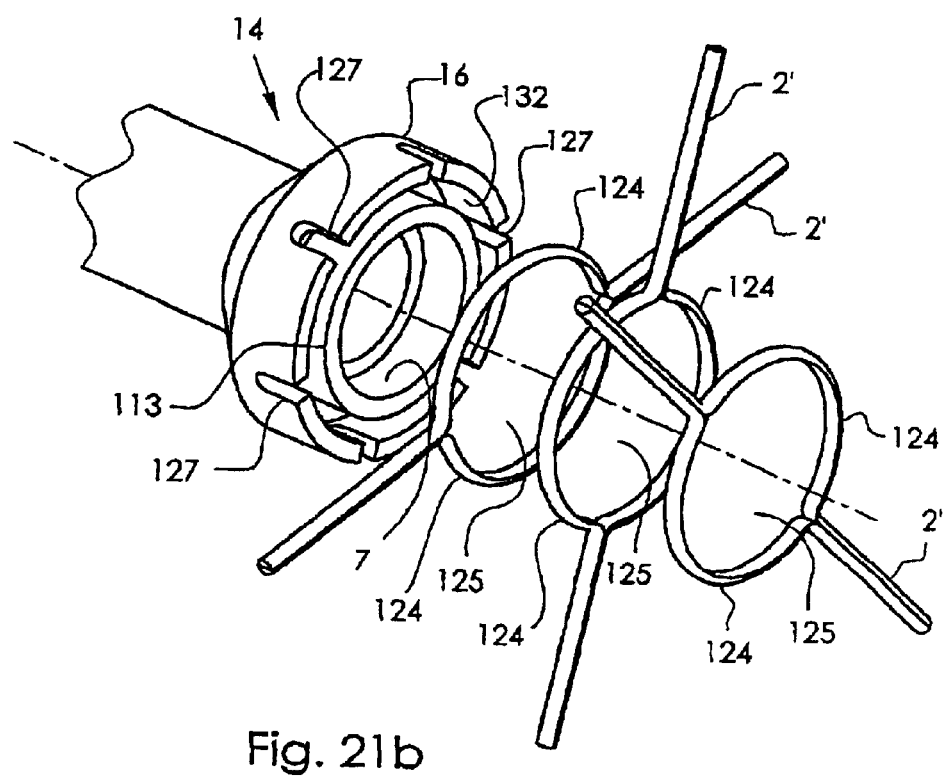
FIG. 21b is a partial perspective exploded view of an alternate embodiment of the present invention, schematically illustrating the assembly of the spoke(s) prior to their encapsulated connection within an open cavity in the hub flange and including an opening in the spoke(s) that circumferentially surrounds the axle bore.
Figure 21C:
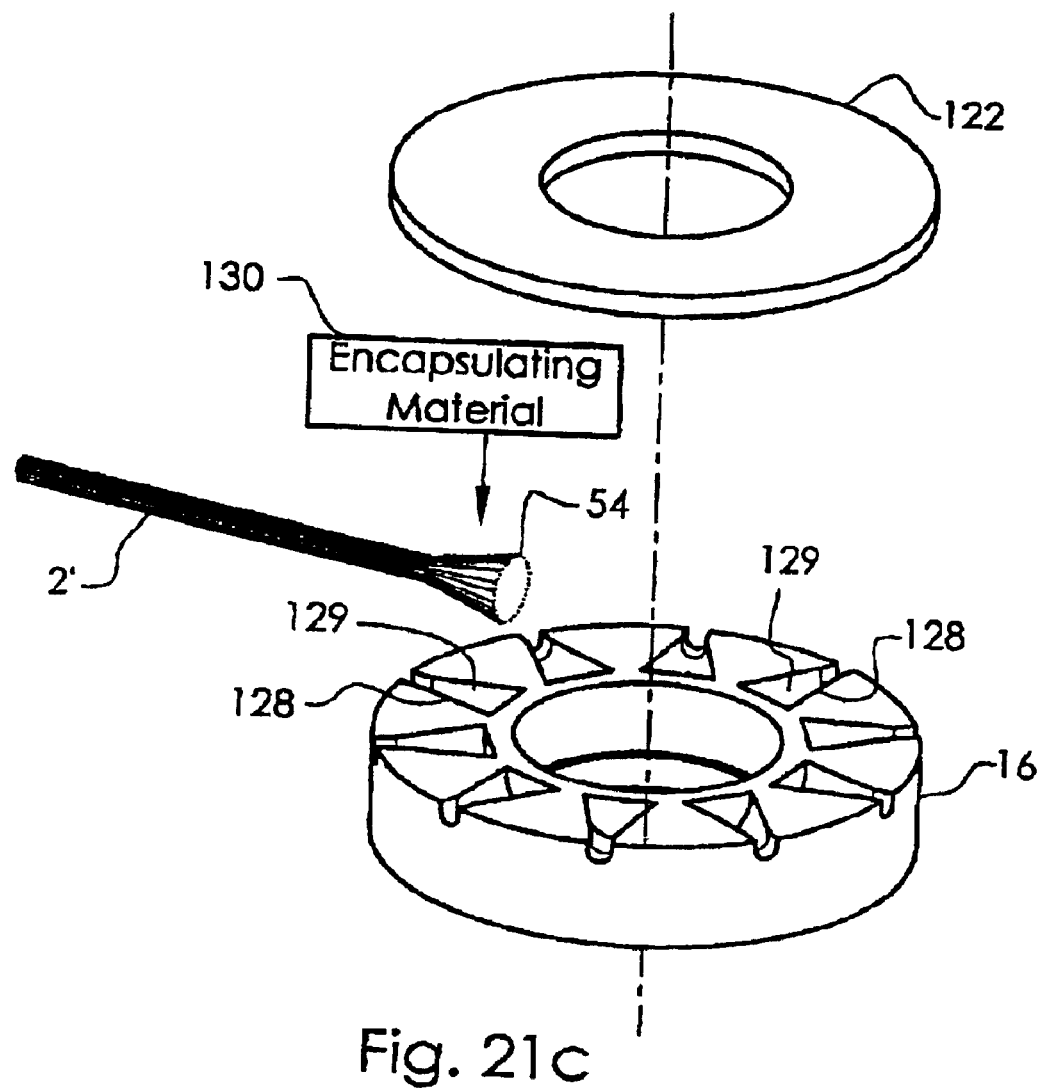
FIG. 21c is a partial perspective exploded view of an alternate embodiment of the present invention, illustrating the assembly of the spoke(s) prior to their encapsulated connection with the hub flange and including a cavity in the hub flange to receive the spoke and a cover to enclose the cavity.

Another series of embodiments are based on a hub flange 16, including a cavity 128 to accept the spoke 2. Cavity 128 includes liquefied encapsulating material 130 therein such that the liquefied encapsulating material 130 is conformed to the cavity 128. When the spoke 2 is introduced to the liquefied encapsulating material 130 (or vice-versa), the encapsulating material 130 is deformed to circumfuse the engaged portion 18 of the spoke 2. When the encapsulating material 130 is subsequently solidified, the encapsulating material 130 becomes connected to both the cavity 128 and the spoke 2. Thus the spoke 2 is anchored to the hub flange 16 via the solidified encapsulating material. Thus it may be considered that the liquefied encapsulating material 130 is a readily conformable portion of the hub flange 16. FIGS. 21a–c describe a series of embodiments that employ a temporarily softened or liquefied encapsulating material 130.

One such arrangement is well illustrated in FIG. 21a where the hub flange 16 includes through-cavities 128 through which the spokes 2 are assembled. When the spoke 2 is assembled in the direction of arrow 107 and located within the cavity 128, liquefied encapsulating material 130 is flowed to circumfuse and fill the clearance between the spoke 2 and the cavity 128. When the encapsulating material 130 solidifies, the spoke 2 is firmly anchored within the cavity 128 of the hub flange 16. Further, to provide a mechanical interlock with the encapsulating material 110, the internal surface of the cavity 128 includes a knurled or threaded portion 126 and the external surface of the spoke 2 includes a threaded portion 64 constituting a configured portion 36. It should be noted that the threaded portion 126 of the cavity 128 and the knurled portion 36 of the spoke 2 have clearance and do not necessarily interlock with each other, but instead they are coupled to each other via the conforming encapsulating material 130. The spoke 2 in this figure is a duplex spoke 2 which includes structural portions 3a and 3b and is aligned to have a straight path through the encapsulated or engaged portion 18 and extending on both ends out to the rim 8 (not shown). This "straight through" spoke alignment eliminates the possibility for any distortion of the spoke 2 within the engaged portion 18.

Multi-filament spokes are spokes that are constructed from a bundle of parallel filaments or fibers that run generally along the length of the spoke. There are many high performance fibers that have become available which have very high tensile strength and stiffness properties, making them ideal for application to vehicle wheel spokes. These fibers are usually available in bundles or yarns and may be supplied as unsupported fiber or they may be impregnated by a matrix resin that encapsulates and binds these fibers. To produce a spoke, the yarns may be combined into a larger bundle or may be commingled by any of a number of processes including braiding, twisting or knitting. Since each multifilament fiber bundle or yarn may contain thousands of fibers, each having its own exterior surface, it is possible to create a highly effective anchoring connection by adhering to the individual fibers through circumfluent encapsulation by the liquefied encapsulating material 110 of hub flange 16. In order to effectively encapsulate the individual fibers, it is often desirable to spread the fibers and expose their outer surfaces to the encapsulating material.

FIG. 21b describes an embodiment where the hub flange 16 includes an axially extending circumferential open cavity 132 formed therein to accept the spokes 2'. Cavity 132 is a continuous cavity with a multiplicity of spokes 2' engaged thereto. The spokes 2' are of multi-filament construction and the fiber bundle is split into two smaller bundles 124 in the region of the cavity 132, creating an opening 125 to circumferentially surround the bearing bore 7. The spoke 2' is located within the cavity 132 so that the smaller bundles 124 straddle the collar 123 that is created by the inside diameter of the cavity 132. In this figure, the collar 123 is generally concentric with the bearing bore 7 of the hub shell 14. The outside diameter of the axial cavity 132 includes openings 127 to allow the spoke 2' to pass through and exit the hub flange 16, extending toward the rim 8. Cavity 132 may be considered a common cavity to engage several spokes 2'. With the desired number of spokes 2' fitted within the cavity 132, liquefied encapsulating material 130 is flowed to fill the cavity 132 and encapsulate the spokes 2'. Thus, when the encapsulating material 130 solidifies, the spokes 2' are engaged and adhered to the encapsulating material 130 and the encapsulating material is engaged and adhered to the cavity 132, thus locking the spoke 2' to the hub flange 16. Hub flange 16 includes bearing bore 7.

An embodiment where individual pockets or open cavities 128 are formed within the hub flange 16 is described in FIG. 21c. These cavities 128 are each shaped to accept the splayed end 54 of a spoke 2' of multi-filament construction. When the splayed end 54 of the spoke 2 is placed within the cavity 128, liquefied encapsulating material 130 is flowed to fill the cavity 128 to encapsulate the individual filaments. Thus, when the encapsulating material 130 solidifies, a solid slug of encapsulating material 130 is cast within the cavity 128 to include the spoke ends 54 that are now solidly anchored to the hub flange 16. The cavity 128 may be designed such that its shape and contour will create a solidified slug of encapsulating material 130 that is mechanically locked within the cavity 128 itself for greater resistance to spoke 2' pull-out. The cavities 128 shown in FIG. 21c, for example, are of a reverse tapering conical shape so that the slug of encapsulating material 130 will wedge within the cavity 128 upon application of spoke tension. During the casting process, a spoke cover 122 may be placed over the cavities 128 of the hub flange 16 to enclose the cavities 128 more fully and create a more complete surround to contain the encapsulating material 130 within the cavity 128. Further, if the spoke cover 122 is fixed to the hub flange 16, it may serve to block the opening 129 of cavity 128, serving to retain the encapsulating material 130 and the associated spoke 2' within the cavity 128. This embodiment is merely representative of many possible configurations where spokes 2' are connected to a single hub flange 16 through an encapsulating process. For example, instead of fitting the spoke 2' to the cavity 128 in an axial direction, the spoke 2' may be fitted to the cavity 128 through an opening that extends in a generally radial direction. In this case, the hub flange 16 would include a series of radially extending cavities 128 and the spoke 2' would be fitted within the cavity through a radially extending opening while a liquefied encapsulating material 130 is flowed into the cavity 128 to capture the spoke 2' upon solidification.

While many of the previous figures have described embodiments where the entire hub flange 16 is molded or cast to surround the spoke 2, it is possible to soften a localized region of the hub flange 16 material directly surrounding the spoke 2. Upon subsequent hardening, the spoke 2 is captured by the hub flange 16 material. One well-known process for achieving such localized melting is known as ultrasonic welding or ultrasonic insertion, whereby mechanical energy is transferred to the hub flange 16 material via the component to be encapsulated. The mechanical energy creates heat at the interface where the two parts contact, thus melting or softening a region directly surrounding the encapsulated component. The softened material is far more easily conformable by the spoke. Ultrasonic welding is especially suited to melt thermoplastic polymers although the process has been applied to metals as well. Other techniques such as spin welding and vibration welding, resistance welding among others, are viable processes that also rely on mechanical or electrical energy to produce localized melting and joining. While the application of mechanical energy is particularly suited to provide the localized melting required for assembly as described, it is also anticipated that the hub flange 16 material may be melted through the direct application of heat or energy from a focused source such as a laser or electron beam.

Figure 22A:
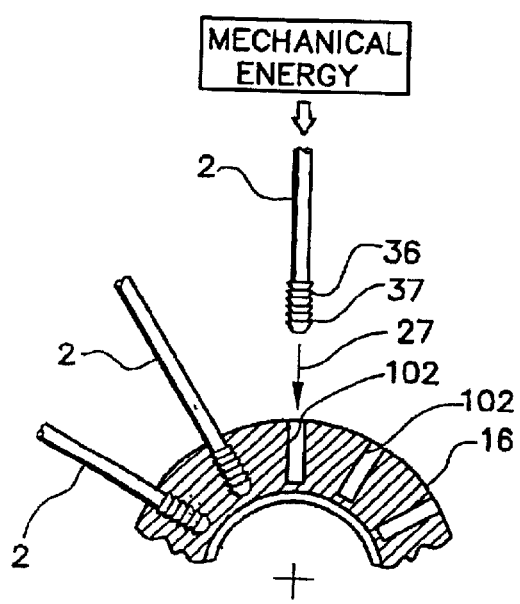
FIG. 22a is a partial cross-section view of the hub flange in axial plan view, schematically illustrating the assembly of the spoke to the hub flange via localized melting of the hub flange material.

An example where mechanical energy is transmitted through a spoke 2 to produce localized melting in the adjacent hub flange 16 material is described in FIG. 22a where the hub flange 16 includes cavities 102 to accept spokes 2. Mechanical energy is imparted to the spoke 2, preferably in the form of ultrasonic vibration such that, when the spoke 2 is brought into contact with the hub flange 16, the mechanical energy produces heat to locally soften the hub flange 16 material. The spoke 2 includes a configured portion 36 to include raked edges 37 in the region that will engage with the cavity 102. To minimize the amount of material that needs to be displaced, it is preferable that the hub flange 16 includes blind cavities 102 to accept the spoke 2. The cavity 102 should be of smaller diameter than the configured portion 36 of the spoke 2 so that the two surfaces will contact, causing melting of the hub flange material 16 surrounding the spoke 2 as the spoke 2 is driven into the cavity 102. As the hub flange material 16 melts, it deforms and flows to follow the contour of the configured portion 36, thus creating a mechanical interlock connection between the spoke 2 and hub flange 16 upon cooling and solidification of the softened material. This joining process may be duplicated as shown to create a direct encapsulated connection between a single hub flange 16 and a multiplicity of spokes 2.

It is also envisioned that mechanical energy may be directed first through the hub flange 16 to effect softening of the hub flange 16 material. For example, an energized ultrasonic welding horn may alternatively be arranged to bear against the hub flange 16, driving the hub flange 16 into contact with the spoke 2, melting the hub flange 16 material and creating an encapsulated engagement with the spoke 2.

While the input of mechanical energy is effective in joining the spoke 2 to the hub flange 16, the hub flange 16 may also be locally melted through the direct application of thermal energy or heat. One such method of joining involves heating of the spoke 2 prior to assembly. As the heated spoke 2 is brought into contact with the hub flange 16, heat is transferred to the hub flange 16, causing localized melting or softening of the hub flange 16 material. The softened hub flange 16 material conforms to encapsulate the end of the spoke 2 so that, upon cooling and solidification, a firm connection between the two components is achieved.

Further, while it is preferable to utilize a preformed cavity 102, it should be noted that such a cavity 102 is not an absolute prerequisite to achieve the deformed engagement described above. It is envisioned that the spoke 2 may be utilized to pierce the surface of the hub flange 16 to form the cavity 102. Thus, the spoke 2 may be used to soften the surface of the hub flange 16 on contact. Forcing the spoke still further below the surface simultaneously forms cavity 102 and results in a deformed engagement between the spoke 2 and the hub flange 16.

Figure 22B:
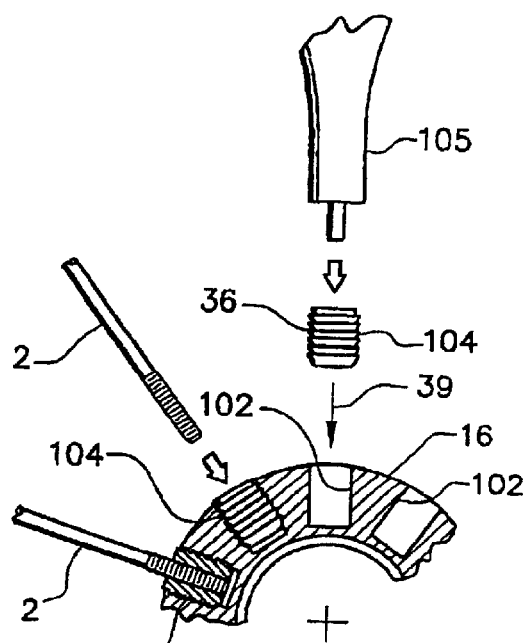
FIG. 22b is a partial cross-section view of the hub flange in axial plan view, schematically illustrating the assembly of the spoke to the hub flange via localized melting of the hub flange material, including an intermediate joining insert.

FIG. 22b describes an embodiment where individual inserts 104 are joined to the hub flange 16 via mechanical energy in a manner similar to that described in FIG. 22a. Thus, the insert 104 preferably includes a configured portion 36 and the hub flange 16 preferably includes cavities 102 to accept the insert 104. As the insert 104 is brought into contact with the hole 102 in the hub flange 16, mechanical energy is transmitted through the insert 104 to the hub flange 16 material via an ultrasonic welding horn 105. The mechanical energy causes localized melting of the hub flange 16 material, allowing the insert 104 to fit within the cavity 102 of the hub flange 16 material. Subsequent resolidification of the softened material, results in a firm connection between the insert 104 and the hub flange 16. The spoke 2 may then be affixed to the insert 104 to create a firm connection with the hub flange 16. Thus, the insert 104 serves as an intermediate connecting member similar to the threaded collar 22 of FIGS. 10a–b. In FIG. 22b, the spoke 2 is threadably fastened to the insert 104 as shown.

Figure 22C:
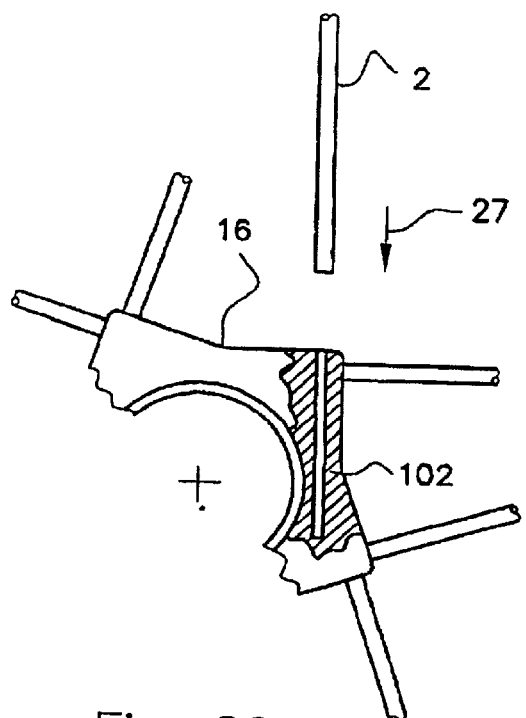
FIG. 22c is a partial axial plan view of the hub region of an embodiment of the present invention in schematic illustration, with the hub flange shown in partial cross-section to reveal a hub flange cavity, in exploded view, showing the spoke prior to welded assembly with the cavity.
Figure 22D:
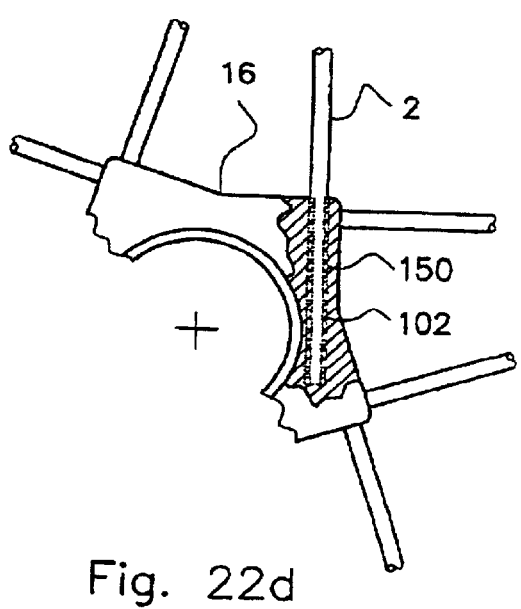
FIG. 22d is a partial axial plan view of the hub region of the embodiment of FIG. 12c, showing a welded connection between the spoke and the hub flange.

FIGS. 22c and 22d describe an arrangement whereby the material of spoke 2 is welded or fused to the material of the hub flange 16. In this figure, spoke 2 is preferably constructed of a fiber reinforced thermoplastic resin such as a nylon resin that is reinforced with longitudinal aramid fibers. FIG. 22c shows the assembly prior to insertion of the spoke 2 into cavity 102. Hub flange 16 includes cavity 102 that is dimensionally undersized as compared with the mating portion of the spoke 2. Mechanical energy is transferred to the spoke 2 in a manner similar to that described in FIG. 22a such that, as spoke 2 is inserted into cavity 102 in the direction of arrow 27, the mechanical energy causes heat to be generated at the interface between the hub flange 16 and spoke 2. This heat causes both the spoke 2 and the surrounding hub flange 16 material to melt and deform, resulting in a welded interface 150 wherein the hub flange 16 material welds and fuses with the spoke 2 material. Upon cooling and solidification of the welded interface 150 a firm connection is achieved between the spoke 2 and the hub flange 16. As mentioned previously, ultrasonic vibration is the preferable method used to supply the mechanical energy to produce the requisite heat. Alternatively, spin-welding techniques may be employed where the spoke 2 is of circular cross section and is spun about its longitudinal axis, resulting in frictional welding at the welded interface 150. In the case where the spoke 2 and the hub flange are formed from electrically conductive materials such as metal, electrical resistance welding techniques may be employed in place of the ultrasonic welding previously described. These welding methods are well known in industry.

Thus, the present invention provides a vehicle wheel that is inexpensive to produce, lends itself easily to high-volume manufacturing methods, is light in weight and is strong and reliable. Further still, the present invention reduces component cost through the use of lower-cost materials and by utilizing net-shape hub forming operations to reduce scrap and fabrication expense. Further still, the present invention reduces wheel weight by facilitating the utilization of light weight hub materials including reinforced polymers, by allowing greater freedom in hub flange detail and geometry to optimize the design, and by facilitating hybrid hub shell construction where high-strength materials are used only where necessary. Yet further, the present invention increases the strength and reliability if the wheel by reducing stresses in components and connections, by eliminating any clearances or relative movement between the hub and spokes, by eliminating any unsupported bends in the spokes.

While my above description contains many specificities, these should not be construed as limitations on the scope of the invention, but rather as exemplifications of embodiments thereof.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A wheel comprising:
   a peripheral wheel rim;
   a central hub with a central axle and an outer flange;
   a plurality of pretensioned spokes extending between the rim and hub, wherein said spokes have a first portion connected to said rim and a second portion opposed to said first portion and connected to said hub;

a cavity formed within at least one of said outer flange and said rim for connection with at least one of said spokes, wherein the cavity is oriented axially and the spoke includes a bent region;

wherein at least one of said first portion and said second portion of said at least one spoke is joined to at least one of said outer flange and said rim by means of a deformed engagement in a deformed engagement region, said cavity surrounding and enclosing the cross-section of said spoke at said deformed engagement region; and wherein said deformed engagement results in a connection to resist relative movement between said cavity and at least one of said first portion and said second portion of said at least one spoke at said engagement region.

2. A wheel according to claim 1, wherein said bent region is external to said deformed engagement region.

3. A wheel according to claim 2, wherein at least one of said rim and outer flange includes a spoke guiding portion that is located external to said deformed engagement region, wherein said spoke guiding portion serves to support said spoke in said bent region.

4. A wheel according to claim 3, including an annular supporting element that surrounds said axle, wherein said annular supporting element includes said spoke guiding portion.

5. A wheel according to claim 1, including at least one reinforcement element contacting said at least one of said rim and said outer flange, wherein said reinforcement element serves to reinforce said at least one of said rim and said outer flange to resist stress and deflection associated with spoke tensile forces.

6. A wheel according to claim 5, wherein said reinforcement element is connected to said outer flange and is a continuous annular element, including a central opening to surround said axle, and wherein said reinforcement element provides at least one of radial and hoop stresses reinforcement to said outer flange.

7. A wheel according to claim 5, wherein said at least one of said spokes is positioned to contact said reinforcement element.

8. A wheel according to claim 5, wherein said reinforcement element is an annular guide ring which is of a harder material than the hub flange.

9. A wheel, comprising:

a peripheral wheel rim;

a central hub with a central axle and an outer flange;

a plurality of pretensioned spokes extending between the rim and hub, wherein said spokes have a first portion connected to said rim and a second portion opposed to said first portion and connected to said hub, further comprising means for adjusting tension in the plurality of pretensioned spokes; and a preformed cavity formed within at least one of said outer flange and said rim for connection with at least one of said spokes, wherein at least one of said first portion and said second portion of said at least one spoke is joined to at least one of said outer flange and said rim by means of a deformed engagement in a deformed engagement region, said cavity enclosing the cross section of said spoke at said deformed engagement region, wherein said deformed engagement region is formed by interaction between said spoke and preformed cavity wherein one of (1) the preformed cavity is deformed by the spoke and (2) the spoke is deformed by the preformed cavity; and including at least one reinforcement element contacting said at least one of said rim and said outer flange, wherein said reinforcement element serves to reinforce said at least one of said rim and said outer flange to resist stress and deflection associated with spoke tensile forces, wherein at least one of said spokes is positioned to contact said reinforcement element; and wherein said deformed engagement results in a connection to resist relative movement between said cavity and at least one of said first portion and second portion of said spoke at said deformed engagement region.

10. A wheel comprising:

a peripheral wheel rim;

a central hub with a central axle and an outer flange;

a plurality of pretensioned spokes extending between the rim and hub, wherein said spokes have a first portion connected to said rim and a second portion opposed to said first portion and connected to said hub, further comprising means for adjusting tension in the plurality of pretensioned spokes; and a preformed cavity formed within at least one of said outer flange and said rim for connection with at least one of said spokes, wherein at least one of said first portion and said second portion of said at least one spoke is joined to at least one of said outer flange and said rim by means of a deformed engagement in a deformed engagement region, said cavity enclosing the cross-section of said spoke at said deformed engagement region, wherein said deformed engagement region is formed by interaction between said spoke and preformed cavity wherein one of (1) the preformed cavity is deformed by the spoke and (2) the spoke is deformed by the preformed cavity; and including at least one reinforcement element contacting said at least one of said rim and said outer flange, wherein said reinforcement element serves to reinforce said at least one of said rim and said outer flange to resist stress and deflection associated with spoke tensile forces, wherein said reinforcement element is an annular guide ring which is of a harder material than the hub flange; and wherein said deformed engagement results in a connection to resist relative movement between said cavity and at least one of said first portion and second portion of said spoke at said deformed engagement region.

\* \* \* \* \*